(12) United States Patent
McDonald

(10) Patent No.: US 7,152,154 B2
(45) Date of Patent: Dec. 19, 2006

(54) APPARATUS AND METHOD FOR INVALIDATION OF REDUNDANT BRANCH TARGET ADDRESS CACHE ENTRIES

(75) Inventor: Thomas McDonald, Austin, TX (US)

(73) Assignee: IP-First, LLC., Fremont, CA (US)

( * ) Notice: Subject to any disclaimer, the term of this patent is extended or adjusted under 35 U.S.C. 154(b) by 545 days.

(21) Appl. No.: 10/632,225

(22) Filed: Jul. 31, 2003

(65) Prior Publication Data

US 2004/0143709 A1  Jul. 22, 2004

Related U.S. Application Data

(60) Provisional application No. 60/440,768, filed on Jan. 16, 2003.

(51) Int. Cl.
*G06F 7/38* (2006.01)
*G06F 9/00* (2006.01)
*G06F 9/44* (2006.01)
*G06F 15/00* (2006.01)

(52) U.S. Cl. ........................................ 712/238; 712/237
(58) Field of Classification Search ................ 712/238, 712/237
See application file for complete search history.

(56) References Cited

U.S. PATENT DOCUMENTS

| | | | |
|---|---|---|---|
| 4,181,942 A | 1/1980 | Forster et al. |
| 4,200,927 A | 4/1980 | Hughes et al. |
| 4,860,197 A | 8/1989 | Langendorf et al. |
| 5,142,634 A | 8/1992 | Fite et al. |
| 5,163,140 A | 11/1992 | Stiles et al. |
| 5,313,634 A | 5/1994 | Eickemeyer |
| 5,353,421 A | 10/1994 | Emma et al. |
| 5,355,459 A | 10/1994 | Matsuo et al. |
| 5,394,530 A | 2/1995 | Kitta |
| 5,404,467 A | 4/1995 | Saba et al. |
| 5,434,985 A | 7/1995 | Emma et al. |
| 5,513,330 A | 4/1996 | Stiles |
| 5,530,825 A | 6/1996 | Black et al. |
| 5,553,246 A | 9/1996 | Suzuki |
| 5,604,877 A | 2/1997 | Hoyt et al. |
| 5,623,614 A | 4/1997 | Van Dyke et al. |
| 5,623,615 A | 4/1997 | Salem et al. |
| 5,634,103 A | 5/1997 | Dietz et al. |
| 5,687,349 A | 11/1997 | McGarity |
| 5,687,360 A | 11/1997 | Chang |
| 5,706,491 A | 1/1998 | McMahan |

(Continued)

OTHER PUBLICATIONS

Eberly, Potter and Rossbach; The Correlation Branch Target Address Cache; May 1, 1996.*

(Continued)

*Primary Examiner*—Fritz Fleming
*Assistant Examiner*—Jesse Moll
(74) *Attorney, Agent, or Firm*—E. Alan Davis; James W. Huffman

(57) ABSTRACT

An apparatus for invalidating redundant entries in an N-way set associative branch target address cache (BTAC) for the same branch instruction is disclosed. An index portion of an instruction cache fetch address is applied to the BTAC to select a set of N ways therein. Control logic detects a condition in which more than one of the N ways of the selected set has a valid tag that matches the tag portion of the fetch address. A flag is set to indicate the occurrence of the condition, and the fetch address is stored in a register. The control logic subsequently invalidates all but one of the N ways having a valid tag that matches the fetch address tag.

23 Claims, 10 Drawing Sheets

U.S. PATENT DOCUMENTS

| | | |
|---|---|---|
| 5,721,855 A | 2/1998 | Hinton et al. |
| 5,734,881 A | 3/1998 | White et al. |
| 5,752,069 A | 5/1998 | Roberts et al. |
| 5,761,723 A | 6/1998 | Black et al. |
| 5,768,576 A | 6/1998 | Hoyt et al. |
| 5,805,877 A | 9/1998 | Black et al. |
| 5,812,839 A | 9/1998 | Hoyt et al. |
| 5,828,901 A | 10/1998 | O'Toole et al. |
| 5,832,289 A | 11/1998 | Shaw et al. |
| 5,850,532 A | 12/1998 | Narayan et al. |
| 5,850,543 A | 12/1998 | Shiell et al. |
| 5,864,707 A | 1/1999 | Tran et al. |
| 5,867,701 A | 2/1999 | Brown et al. |
| 5,881,260 A | 3/1999 | Raje et al. |
| 5,881,265 A | 3/1999 | McFarland et al. |
| 5,931,944 A | 8/1999 | Ginosar et al. |
| 5,948,100 A | 9/1999 | Hsu et al. |
| 5,961,629 A | 10/1999 | Nguyen et al. |
| 5,964,868 A | 10/1999 | Gochman et al. |
| 5,968,169 A | 10/1999 | Pickett |
| 5,974,543 A | 10/1999 | Hilgendorf et al. |
| 5,978,909 A | 11/1999 | Lempel |
| 6,035,391 A | 3/2000 | Isaman |
| 6,041,405 A | 3/2000 | Green |
| 6,044,459 A | 3/2000 | Bae et al. |
| 6,081,884 A | 6/2000 | Miller |
| 6,085,311 A | 7/2000 | Narayan et al. |
| 6,088,793 A | 7/2000 | Liu et al. |
| 6,101,595 A | 8/2000 | Pickett et al. |
| 6,108,773 A | 8/2000 | Col et al. |
| 6,122,729 A | 9/2000 | Tran |
| 6,134,654 A | 10/2000 | Patel et al. |
| 6,151,671 A | 11/2000 | D'Sa et al. |
| 6,157,988 A | 12/2000 | Dowling |
| 6,170,054 B1 | 1/2001 | Poplingher |
| 6,175,897 B1 | 1/2001 | Ryan et al. |
| 6,185,676 B1 | 2/2001 | Poplingher et al. |
| 6,233,676 B1 | 5/2001 | Henry et al. |
| 6,250,821 B1 | 6/2001 | Schwendinger |
| 6,256,727 B1 | 7/2001 | McDonald |
| 6,260,138 B1 | 7/2001 | Harris |
| 6,279,105 B1 | 8/2001 | Konigsburg et al. |
| 6,279,106 B1 | 8/2001 | Roberts |
| 6,308,259 B1 | 10/2001 | Witt |
| 6,314,514 B1 | 11/2001 | McDonald |
| 6,321,321 B1 * | 11/2001 | Johnson ............ 711/217 |
| 6,351,796 B1 | 2/2002 | McCormick et al. |
| 6,374,350 B1 | 4/2002 | D'Sa et al. |
| 6,457,120 B1 | 9/2002 | Sinharoy |
| 6,502,185 B1 | 12/2002 | Keller et al. |
| 6,560,696 B1 | 5/2003 | Hummel et al. |
| 6,601,161 B1 | 7/2003 | Rappoport et al. |
| 6,647,467 B1 | 11/2003 | Dowling |
| 6,725,357 B1 | 4/2004 | Cousin |
| 6,748,441 B1 | 6/2004 | Gemmell |
| 6,754,808 B1 | 6/2004 | Roth et al. |
| 6,823,444 B1 | 11/2004 | Henry et al. |
| 6,886,093 B1 | 4/2005 | Henry et al. |
| 6,895,498 B1 | 5/2005 | McDonald et al. |
| 6,898,699 B1 | 5/2005 | Jourdan et al. |
| 6,968,444 B1 | 11/2005 | Kroesche et al. |
| 2002/0188833 A1 | 12/2002 | Henry et al. |
| 2002/0194460 A1 | 12/2002 | Henry et al. |
| 2002/0194461 A1 | 12/2002 | Henry et al. |
| 2002/0194464 A1 | 12/2002 | Henry et al. |
| 2004/0030866 A1 | 2/2004 | McDonald |
| 2004/0139301 A1 | 7/2004 | McDonald |
| 2004/0143709 A1 | 7/2004 | McDonald |
| 2004/0143727 A1 | 7/2004 | McDonald |
| 2005/0044343 A1 | 2/2005 | Henry et al. |
| 2005/0076193 A1 | 4/2005 | Henry et al. |
| 2005/0114636 A1 | 5/2005 | McDonald et al. |
| 2005/0132175 A1 | 6/2005 | Henry et al. |
| 2005/0198479 A1 | 9/2005 | Bean et al. |
| 2005/0198481 A1 | 9/2005 | Henry et al. |

OTHER PUBLICATIONS

David A. Patterson and John L. Hennessy, Computer Organization & Design The Hardware/Software Interface, 1998.*

*Microprocessor Report.* vol. 9. No. 2. Feb. 16, 1996, p. 5.

*Microprocessor Report.* Aug. 23, 1999. p. 7.

Yeh et al. *Alternative Implementation of Two-Level Adaptive Branch Prediction.* 19th Annual International Symposium on Computer Architecture. pp. 124-134. May 19-21, 1992. Gold Coast, Australia.

Chang et al. *Alternative Implementations of Hybrid Branch Predictors.* Proceedings of MICRO-28. 1995. IEEE.

Mc Farling, Scott. *WRL Technical Note TN-36.* Combining Branch Predictors. Jun. 1993. Western Research Laboratory, 250 University Ave., Palo Alto, CA 94301.

Bray et al. *Strategies For Branch Target Buffers.* Technical Report No. CSL-TR-91-480. Jun. 1991.

Sakamoto et al. *Microarchitecture Support for Reducing Branch Penalty in a Superscaler Processor.* pp. 208-216. Mittsubishi Electric Corp. 4-1 Mizuhara, Itami, Hyogo 664. Japan, 1996. IEEE.

IEEE 100, The Authoritative Dictionary of IEEE Standard Terms, Seventh Edition. The Institute of Electrical Engineering, Inc. New York: Standards Information Network IEEE Press p. 135.

Online Computing Dictionary. http://instantweb.com/d/dictionary/foldoc.cgi?query=btb May 5, 1995. Branch Target Buffer.

The D Latch, Play-Hookey Web Page, Oct. 10, 1999.

Patterson et al. "Computer Organization & Design: The Hardware/Software Interface."Morgan Kaufmann Publishers, Inc. San Francisco, CA. 1998 p. 469.

Jimenez et al. "The Impact of Delay on the Design of the Branch Predictors."2000.

IBM Technical Disclosure Bulletin NN9204269, "Return Address Stack Cache." Apr. 1992, pp. 269-271.

* cited by examiner

BTAC Write Queue Operation

Deadlock Resolution Apparatus Operation

APPARATUS AND METHOD FOR INVALIDATION OF REDUNDANT BRANCH TARGET ADDRESS CACHE ENTRIES

PRIORITY INFORMATION

This application claims priority based on U.S. Provisional Application, Ser. No. 60/440,768, filed Jan. 16, 2003, entitled APPARATUS AND METHOD FOR INVALIDATION OF REDUNDANT BRANCH TARGET ADDRESS CACHE ENTRIES

CROSS REFERENCE TO RELATED APPLICATIONS

This application is related to co-pending U.S. patent applications Ser. No. 10/632,226 and Ser. No. 10/632,219 filed concurrently herewith.

FIELD OF THE INVENTION

This invention relates in general to the field of branch prediction in microprocessors and particularly to branch prediction using a speculative branch target address cache.

BACKGROUND OF THE INVENTION

Modern microprocessors are pipelined microprocessors. That is, they operate on several instructions at the same time, within different blocks or pipeline stages of the microprocessor. Hennessy and Patterson define pipelining as, "an implementation technique whereby multiple instructions are overlapped in execution." *Computer Architecture: A Quantitative Approach*, $2^{nd}$ edition, by John L. Hennessy and David A. Patterson, Morgan Kaufmann Publishers, San Francisco, Calif., 1996. They go on to provide the following excellent illustration of pipelining:

A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line.

Synchronous microprocessors operate according to clock cycles. Typically, an instruction passes from one stage of the microprocessor pipeline to another each clock cycle. In an automobile assembly line, if the workers in one stage of the line are left standing idle because they do not have a car to work on, then the production, or performance, of the line is diminished. Similarly, if a microprocessor stage is idle during a clock cycle because it does not have an instruction to operate on—a situation commonly referred to as a pipeline bubble—then the performance of the processor is diminished.

A potential cause of pipeline bubbles is branch instructions. When a branch instruction is encountered, the processor must determine the target address of the branch instruction and begin fetching instructions at the target address rather than the next sequential address after the branch instruction. Furthermore, if the branch instruction is a conditional branch instruction (i.e., a branch that may be taken or not taken depending upon the presence or absence of a specified condition), the processor must decide whether the branch instruction will be taken, in addition to determining the target address. Because the pipeline stages that ultimately resolve the target address and/or branch outcome (i.e., whether the branch will be taken or not taken) are typically well below the stages that fetch the instructions, bubbles may be created.

To address this problem, modern microprocessors typically employ branch prediction mechanisms to predict the target address and branch outcome early in the pipeline. An example of a branch prediction mechanism is a branch target address cache (BTAC) that predicts the branch outcome and target address in parallel with instruction fetches from an instruction cache of the microprocessor. When a microprocessor executes a branch instruction and definitively resolves that the branch is taken and its target address, the address of the branch instruction and its target address are written into the BTAC. The next time the branch instruction is fetched from the instruction cache, the branch instruction address hits in the BTAC and the BTAC supplies the branch instruction target address early in the pipeline.

An effective BTAC improves processor performance by potentially eliminating or reducing the number of bubbles that would otherwise be suffered waiting for the branch instruction to be resolved. However, when the BTAC makes an incorrect prediction, portions of the pipeline having incorrectly fetched instructions must be flushed, and the correct instructions must be fetched, which introduces bubbles into the pipeline while the flushing and fetching occurs. As microprocessor pipelines get deeper, the effectiveness of the BTAC becomes more critical to performance.

The effectiveness of the BTAC is largely a function of the hit rate of the BTAC. One factor that affects the BTAC hit rate is the number of different branch instructions for which it stores target addresses. The more branch instruction target addresses stored, the more effective the BTAC is. However, there is always limited area on a microprocessor die and therefore pressure to make the size of a given functional block, such as a BTAC, as small as possible. A factor that affects the physical size of the BTAC is the size of the storage cells that store the target addresses and related information within the BTAC. In particular, a single-ported cell is generally smaller than a multi-ported cell. A BTAC composed of single-ported cells can only be read or written, but not both, during a given clock cycle, whereas a BTAC composed of multi-ported cells can be read and written simultaneously during a given clock cycle. However, a multi-ported BTAC will be physically larger than a single-ported BTAC. This may mean, assuming a given physical size allowance for the BTAC, that the number of target addresses that can be stored in a multi-ported BTAC must be smaller than the number of target addresses that could be stored in a single-ported BTAC, thereby reducing the effectiveness of the BTAC. Thus, a single-ported BTAC is preferable in this respect.

However, the fact that a single-ported BTAC can only be read or written, but not both, during a given clock cycle may reduce the BTAC effectiveness due to false misses. A false miss occurs when a single-ported BTAC is being written, such as to update the BTAC with a new target address or to invalidate a target address, during a cycle in which the BTAC needs to be read. In this case, the BTAC must generate a miss to the read, since it cannot supply the target address, which may be present in the BTAC, because the BTAC is currently being written.

Therefore what is needed is a method and apparatus for reducing false misses in a single-ported BTAC.

Another phenomenon that can reduce the effectiveness of a BTAC is a condition in which the BTAC is storing a target address for the same branch instruction multiple times. This phenomenon can occur in a multi-way set-associative BTAC. Because BTAC space is limited, this redundant storage of target addresses reduces BTAC effectiveness because the redundant BTAC entries could be storing a target address of other branch instructions. The longer the pipeline, i.e., the greater the number of stages, the greater the likelihood that redundant target addresses will get stored in a BTAC.

The most common situation in which the same branch instruction gets cached multiple times in the BTAC is in a tight loop of code. A branch instruction is executed a first time and its target address is written into the BTAC, for example, to way 2 since way 2 is the least recently used way. However, before the target address is written into the BTAC, the branch instruction is encountered again, i.e., the BTAC looks up the instruction cache fetch address which misses since the target address has not yet been written into the BTAC. Consequently, the target address is written a second time into the BTAC. If an intervening BTAC read of a different branch instruction in the set causes way 2 to no longer be the least recently used way, then a different way, for example way 1, is selected to write the target address into the second time. Now the target address for the same branch instruction is present in the BTAC twice. This is a waste of BTAC space and reduces the effectiveness of the BTAC since it is highly likely that the second write replaced a valid target address of another branch instruction.

Therefore, what is needed is a method and apparatus for avoiding the waste of valuable BTAC space caused by redundant caching of a target address for the same branch instruction.

Furthermore, a certain combination of conditions associated with the speculative nature of a BTAC can cause a deadlock situation in the microprocessor. The combination of BTAC speculative branch predictions, a branch instruction that wraps across an instruction cache line boundary, and the fact that processor bus transactions for speculative instruction fetches can cause error conditions, can result in deadlock in certain cases.

Therefore, what is needed is a method and apparatus for avoiding a deadlock condition in a microprocessor employing a speculative BTAC.

SUMMARY OF THE INVENTION

The present invention provides a method and apparatus for invalidating redundant entries in a BTAC for the same branch instruction, thereby avoiding wasting space in the BTAC with the redundant entries. In one aspect the present invention provides an apparatus in a pipelined microprocessor for invalidating a redundant entry for the same branch instruction in a set associative branch target address cache (BTAC). The apparatus includes a way specifier, generated in a first pipeline stage, for specifying one of a plurality of ways of the BTAC for storing a target address of a branch instruction present in a cache line specified by an instruction cache fetch address missing in the BTAC. The apparatus also includes a request, generated in a second pipeline stage, for requesting the BTAC to write a resolved target address of the branch instruction into the one of the plurality of ways specified by the way specifier in the first pipeline stage. The second pipeline stage is subsequent to the first pipeline stage and the first and second pipeline stages are separated by at least three pipeline stages. The apparatus also includes a status indicator, for indicating whether at least two ways of a set of the BTAC selected by an instruction cache fetch address contain a valid branch target address for a same branch instruction. The apparatus also includes control logic, coupled to the status indicator, for invalidating one of the at least two ways of the selected set if the status indicator indicates at least two ways of the selected set contain a valid branch target address for a same branch instruction.

In another aspect, the present invention provides an apparatus in a pipelined microprocessor for invalidating redundant entries for the same branch instruction in a branch target address cache (BTAC). The apparatus includes a way specifier, generated in a first pipeline stage, for specifying one of a plurality of ways of the BTAC for storing a target address of a branch instruction present in a cache line specified by an instruction cache fetch address missing in the BTAC. The apparatus also includes a request, generated in a second pipeline stage, for requesting the BTAC to write a resolved target address of the branch instruction into the one of the plurality of ways specified by the way specifier in the first pipeline stage. The second pipeline stage is subsequent to the first pipeline stage and the first and second pipeline stages are separated by at least three pipeline stages. The apparatus also includes detection logic, for detecting a condition in which more than one valid way of a plurality of ways of a selected set of the BTAC are storing a target address for a same branch instruction. The apparatus also includes invalidation logic, coupled to the detection logic, for invalidating all but one of the more than one valid way of the selected set.

In another aspect, the present invention provides a pipelined microprocessor. The microprocessor includes an instruction cache, having an address input for receiving an address to select a line including a branch instruction. The microprocessor also includes a branch target address cache (BTAC), coupled to the instruction cache, for generating a plurality of indicators in response to the address. Each of the plurality of indicators indicates whether a corresponding way in a set of the BTAC selected by the address is storing a valid target address of the branch instruction. The microprocessor also includes logic, coupled to the BTAC, configured to invalidate one or more of the plurality of ways of the selected set if the plurality of indicators indicates two or more of the plurality of ways is storing a valid target address of the branch instruction. The microprocessor also includes a first pipeline stage, in which the BTAC indicates a miss of the address therein, and in which the BTAC specifies one of the plurality of ways for storing the target address. The microprocessor also includes a second pipeline stage, subsequent to the first pipeline stage, which requests the BTAC to write a resolved target address of the branch instruction into the one of the plurality of ways specified by the BTAC in the first pipeline stage. The first and second pipeline stages are separated by at least three pipeline stages.

In another aspect, the present invention provides a method for invalidating redundant entries in a set-associative branch target address cache (BTAC) for the same branch instruction. The method includes determining whether a tag of more than one way of a set of the BTAC selected by an index portion of an instruction cache fetch address matches a tag portion of the instruction cache fetch address and is valid. The method also includes invalidating all but one way of the selected set, if more than one way of the selected set is valid and matching. The method also includes indicating, in a first pipeline stage, a miss of the address in the BTAC and specifying one of the plurality of ways for storing a target address of a branch instruction included in a cache line selected by the address in an instruction cache. The method also includes requesting the BTAC, in a second pipeline stage, to write a resolved target address of the branch instruction into the one of the plurality of ways specified by the BTAC in the first pipeline stage, wherein the second pipeline stage is subsequent to the first pipeline stage and the first and second pipeline stages are separated by at least three pipeline stages.

In another aspect, the present invention provides a method for invalidating a redundant entry for the same branch instruction in the same set of an N-way set associative branch target address cache (BTAC). The method includes selecting an N-way set in the BTAC with a lower portion of an instruction fetch address. The method also includes comparing N address tags of N corresponding ways of the N-way set with an upper portion of the instruction fetch address. The method also includes determining whether two or more of the N address tags match the upper portion and are valid. The method also includes invalidating, if two or more of the N address tags match the upper portion and are valid, one or more of the N ways corresponding to the two or more of the valid N address tags matching the upper portion. The method also includes indicating, in a first pipeline stage, a miss of the address in the BTAC and specifying one of the N ways for storing a target address of a branch instruction included in a cache line selected by the address in an instruction cache. The method also includes requesting the BTAC, in a second pipeline stage, to write a resolved target address of the branch instruction into the one of the N ways specified by the BTAC in the first pipeline stage, wherein the second pipeline stage is subsequent to the first pipeline stage and the first and second pipeline stages are separated by at least three pipeline stages.

In another aspect, the present invention provides a computer program embodied on a computer-readable medium, comprising computer-readable program code for providing a pipeline microprocessor. The program code includes first program code for providing an instruction cache, having an address input for receiving an address to select a line including a branch instruction. The program code also includes second program code for providing a branch target address cache (BTAC), coupled to the instruction cache, for generating a plurality of indicators in response to the address. Each of the plurality of indicators indicates whether a corresponding way in a set of the BTAC selected by the address is storing a valid target address of the branch instruction. The program code also includes third program code for providing logic, coupled to the BTAC, configured to invalidate one or more of the plurality of ways of the selected set if the plurality of indicators indicates two or more of the plurality of ways is storing a valid target address of the branch instruction. The program code also includes fourth program code for providing a first pipeline stage, in which the BTAC indicates a miss of the address therein, and in which the BTAC specifies one of the plurality of ways for storing the target address. The program code also includes fifth program code for providing a second pipeline stage, subsequent to the first pipeline stage, which requests the BTAC to write a resolved target address of the branch instruction into the one of the plurality of ways specified by the BTAC in the first pipeline stage. The first and second pipeline stages are separated by at least three pipeline stages.

An advantage of the present invention is that it potentially improves the efficiency of a BTAC by enabling target addresses to be cached for a greater number of branch instructions by eliminating redundant target addresses for the same branch instruction.

Other features and advantages of the present invention will become apparent upon study of the remaining portions of the specification and drawings.

DETAILED DESCRIPTION

Figure 1:
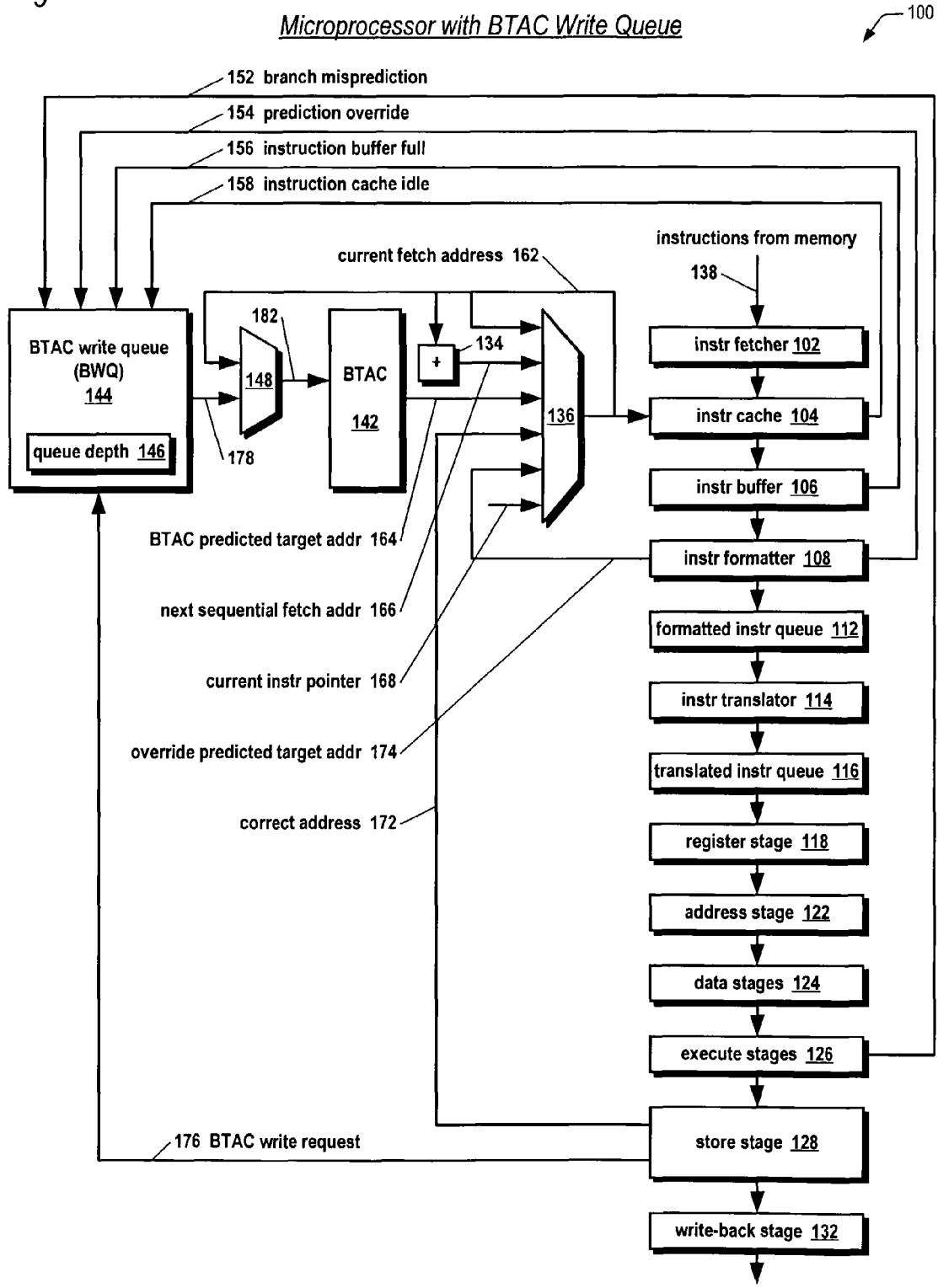
FIG. 1 is a block diagram of a microprocessor according to the present invention.

Referring now to FIG. 1, a block diagram of a microprocessor 100 according to the present invention is shown. Microprocessor 100 comprises a pipelined microprocessor.

Microprocessor 100 includes an instruction fetcher 102. Instruction fetcher 102 fetches instructions 138 from a memory, such as a system memory, coupled to microprocessor 100. In one embodiment, instruction fetcher 102 fetches instructions 138 from memory in the granularity of a cache line. In one embodiment, instructions 138 are variable length instructions. That is, the length of ail the instructions in the instruction set of microprocessor 100 are not the same. In one embodiment, microprocessor 100 comprises a microprocessor whose instruction set conforms substantially to the x86 architecture instruction set, whose instruction lengths are variable.

Microprocessor 100 also includes an instruction cache 104 coupled to instruction fetcher 102. Instruction cache 104 receives cache lines of instruction bytes from instruction fetcher 102 and caches the instruction cache lines for subsequent use by microprocessor 100. In one embodiment, instruction cache 104 comprises a 64 KB 4-way set associative level-1 cache. When an instruction is missing in instruction cache 104, instruction cache 104 notifies instruction fetcher 102, which responsively fetches the cache line including the missing instruction from memory. A current fetch address 162 is applied to instruction cache 104 to select a cache line therein. In one embodiment, a cache line in instruction cache 104 comprises 32 bytes. Instruction cache 104 also generates an instruction cache idle signal 158. Instruction cache 104 generates a true value on instruction cache idle signal 158 when instruction cache 104 is idle. Instruction cache 104 is idle when instruction cache 104 is not being read. In one embodiment, if instruction cache 104 is not being read, then a branch target address cache (BTAC) 142 of the microprocessor, discussed in more detail below, is not being read.

Microprocessor 100 also includes an instruction buffer 106 coupled to instruction cache 104. Instruction buffer 106 receives cache lines of instruction bytes from instruction cache 104 and buffers the cache lines until they can be formatted into distinct instructions to be executed by microprocessor 100. In one embodiment, instruction buffer 106 comprises four entries for storing up to four cache lines. Instruction buffer 106 generates an instruction buffer full signal 156. Instruction buffer 106 generates a true value on instruction buffer full signal 156 when instruction buffer 106 is full. In one embodiment, if instruction buffer 106 is full, then BTAC 142 is not being read.

Microprocessor 100 also includes an instruction formatter 108 coupled to instruction buffer 106. Instruction formatter 108 receives instruction bytes from instruction buffer 106 and generates formatted instructions therefrom. That is, instruction formatter 108 views a string of instruction bytes in instruction buffer 106, determines which of the bytes comprise the next instruction and the length thereof, and outputs the next instruction and its length. In one embodiment, the formatted instructions comprise instructions conforming substantially to the x86 architecture instruction set.

Instruction formatter 108 also includes logic for generating a branch target address, referred to as override predicted target address 174. In one embodiment, the branch target address generation logic includes an adder for adding an offset of a relative branch instruction to a branch instruction address to generate override predicted target address 174. In one embodiment, the logic comprises a branch target buffer for generating target addresses of indirect branch instructions. In one embodiment, the logic comprises a call/return stack for generating target addresses of call and return instructions. Instruction formatter 108 also generates a prediction override signal 154. Instruction formatter 108 generates a true value on prediction override signal 154 to override a branch prediction made by a branch target address cache (BTAC) 142 comprised in microprocessor 100, described in detail below. That is, if the target address generated by the logic in instruction formatter 108 does not match the target address generated by BTAC 142, then instruction formatter 108 generates a true value on prediction override signal 154 to cause the instructions fetched because of the BTAC 142 prediction to be flushed and to cause microprocessor 100 to branch to the override predicted target address 174. In one embodiment, BTAC 142 is not being read during a portion of the time that the instructions are being flushed and microprocessor 100 is branching to the override predicted target address 174.

Figure 12:
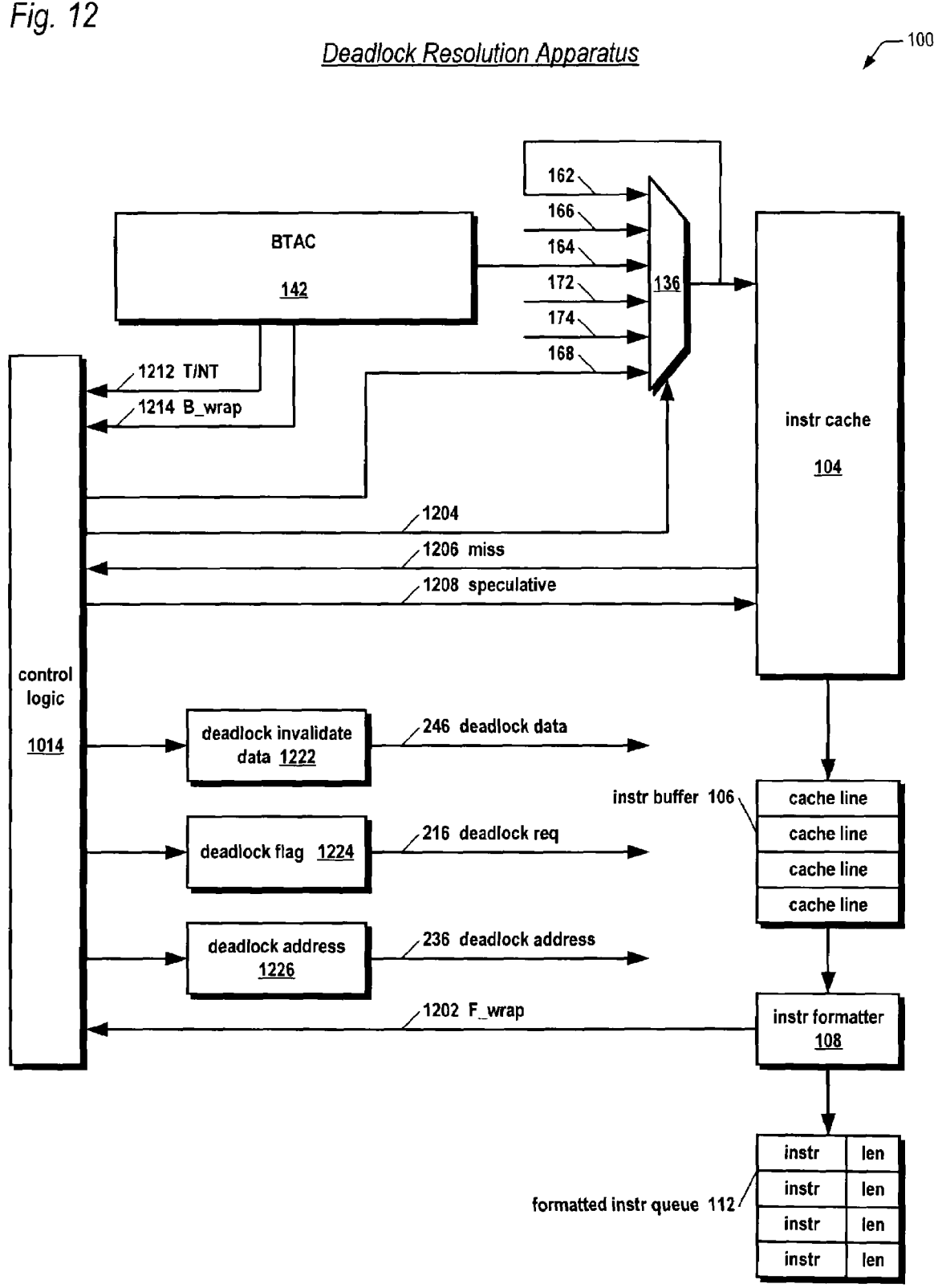
FIG. 12 is a block diagram illustrating deadlock avoidance logic within the microprocessor of FIG. 1 according to the present invention.

Microprocessor 100 also includes a formatted instruction queue 112 coupled to instruction formatter 108. Formatted instruction queue 112 receives formatted instructions from instruction formatter 108 and buffers the formatted instructions until they can be translated into microinstructions. In one embodiment, formatted instruction queue 112 comprises entries for storing up to twelve formatted instructions, although FIG. 12 shows only four entries.

Microprocessor 100 also includes an instruction translator 114 coupled to formatted instruction queue 112. Instruction translator 114 translates the formatted macroinstructions stored in formatted instruction queue 112 into microinstructions. In one embodiment, microprocessor 100 includes a reduced instruction set computer (RISC) core that executes microinstructions of the native, or reduced, instruction set.

Microprocessor 100 also includes a translated instruction queue 116 coupled to instruction translator 114. Translated instruction queue 116 receives translated microinstructions from instruction translator 114 and buffers the microinstructions until they can be executed by the remainder of the microprocessor pipeline.

Microprocessor 100 also includes a register stage 118 coupled to translated instruction queue 116. Register stage 118 comprises a plurality of registers for storing instruction operands and results. Register stage 118 includes a user-visible register file for storing the user-visible state of microprocessor 100.

Microprocessor 100 also includes an address stage 122 coupled to register stage 118. Address stage 122 includes address generation logic for generating memory addresses for instructions that access memory, such as load or store instructions and branch instructions.

Microprocessor 100 also includes data stages 124 coupled to address stage 122. Data stages 124 include logic for loading data from memory and one or more caches for caching data loaded from memory.

Microprocessor 100 also includes execute stages 126 coupled to data stage 124. Execute stages 126 include execution units for executing instructions, such as arithmetic and logic units for executing arithmetic and logic instructions. In one embodiment, execution stages 126 include an integer execution unit, a floating point execution unit, an MMX execution unit, and an SSE execution unit. Execute stages 126 also include logic for resolving branch instructions. In particular, execute stages 126 determine whether a branch instruction is taken and whether BTAC 142 previously mispredicted the branch instruction was taken. Additionally, execute stages 126 determine whether a branch target address previously predicted by BTAC 142 was mispredicted by BTAC 142, i.e., was incorrect. Execute stages 126 generate a true value on a branch misprediction signal 152 if execute stages 126 determine that a previous branch prediction was incorrect to cause the instructions fetched because of the BTAC 142 misprediction to be flushed and to cause microprocessor 100 to branch to the correct address 172. In one embodiment, BTAC 142 is not being read during a portion of the time that the instructions are being flushed and microprocessor 100 is branching to the correct address 172.

Microprocessor 100 also includes a store stage 128 coupled to execute stages 126. Store stage 128 includes logic for storing data to memory in response to store microinstructions. Store stage 128 generates a correct address 172. Correct address 172 is used to correct a previous branch misprediction indicated by branch misprediction signal 152. Correct address 172 comprises the correct branch target address of a branch instruction. That is, correct address 172 is a non-speculative target address of a branch instruction. Correct address 172 is also written into BTAC 142 when a branch instruction is executed and resolved, as described in more detail below. Store stage 128 also generates a BTAC write request 176 for updating BTAC 1421. A BTAC write request 176 is described in detail below with respect to FIG. 7.

Microprocessor 100 also includes a write-back stage 132 coupled to store stage 128. Write-back stage 132 includes logic for writing an instruction result to register stage 118.

Microprocessor 100 also includes BTAC 142. BTAC 142 comprises a cache memory for caching target addresses and other branch prediction information. BTAC 142 generates a predicted target address 164 in response to an address 182 received from a multiplexer 148. In one embodiment, BTAC 142 comprises a single-ported cache memory, which must be shared by read and write accesses to BTAC 142, thereby creating the possibility of generating a false miss of BTAC 142. BTAC 142 and multiplexer 148 are described in more detail below.

Microprocessor 100 also includes a second multiplexer 136 coupled to BTAC 142. Multiplexer 136 selects one of six inputs to provide as current fetch address 162 on its output. One input is a next sequential fetch address 0.166 generated by an adder 134, which increments current fetch address 162 by the size of a cache line to generate next sequential fetch address 166. After a normal fetch of a cache line from instruction cache 104, multiplexer 136 selects next sequential fetch address 166 to output as current fetch address 162. Another input is current fetch address 162. Another input is BTAC predicted target address 164, which multiplexer 136 selects if BTAC 142 indicates a branch instruction is present in the cache line selected from instruction cache 104 by current fetch address 162 and BTAC 142 predicts the branch instruction will be taken. Another input is correct address 172 received from store stage 128, which multiplexer 136 selects to correct a branch misprediction. Another input is override predicted target address 174 received from instruction formatter 108, which multiplexer 136 selects to override the BTAC predicted target address 164. Another input is a current instruction pointer 168, which specifies the address of the instruction currently being formatted by instruction formatter 108. Multiplexer 136 selects current instruction pointer 168 in order to avoid a deadlock condition, as described below.

Microprocessor 100 also includes a BTAC write queue (BWQ) 144 coupled to BTAC 142. BTAC write queue 144 comprises a plurality of storage elements for buffering BTAC write requests 176 until they can be written into BTAC 142. BTAC write queue 144 receives branch misprediction signal 152, prediction override signal 154, instruction buffer full signal 156, and instruction cache idle signal 158. Advantageously, BTAC write queue 144 enables delaying the update of BTAC 142 with BTAC write requests 176 until an opportune time, namely when BTAC 142 is not being read, as indicated by input signals 152 through 158, in order to increase the efficiency of BTAC 142, as described in more detail below.

BTAC write queue 144 generates a BTAC write queue address 178, which is provided as an input to multiplexer 148. BTAC write queue 144 also includes a register for storing a current queue depth 146. Queue depth 146 specifies the number of valid BTAC write requests 176 currently stored in BTAC write queue 144. Queue depth 146 is initialized to zero. Each time a BTAC write request 176 is received into BTAC write queue 144, queue depth 146 is incremented. Each time a BTAC write request 176 is removed from BTAC write queue 144, queue depth 146 is decremented. BTAC write queue 144 is described in more detail below.

Figure 2:
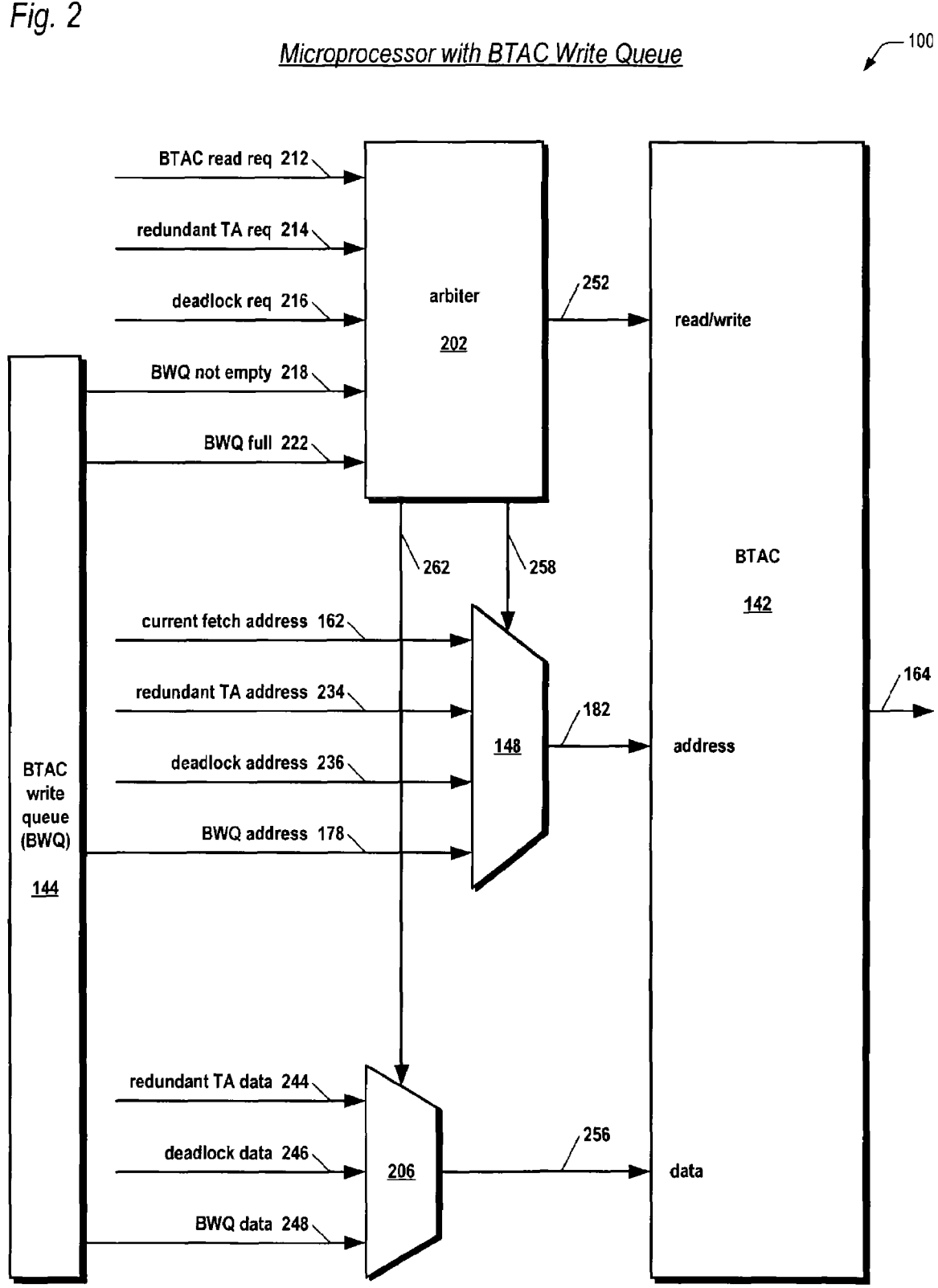
FIG. 2 is a block diagram illustrating portions of the microprocessor of FIG. 1 in more detail according to the present invention.

Referring now to FIG. 2, a block diagram illustrating portions of microprocessor 100 of FIG. 1 in more detail according to the present invention is shown. FIG. 2 shows BTAC write queue 144, BTAC 142, and multiplexer 148 of FIG. 1, in addition to an arbiter 202 and a three-input multiplexer 206 coupled between BTAC write queue 144 and BTAC 142. Although FIG. 1 shows multiplexer 148 receiving only two inputs, multiplexer 148 is a four-input mux, as shown in FIG. 2. As shown in FIG. 2, BTAC 142 includes a read/write input, an address input and a data input.

A shown in FIG. 1, multiplexer 148 receives current fetch address 162 and BWQ address 178. Additionally, multiplexer 148 receives a redundant TA address 234 and a deadlock address 236, which are described in more detail below with respect to FIGS. 10–11 and 12–13, respectively. Multiplexer 148 selects one of the four inputs to output on address signal 182 of FIG. 1, which is provided to the BTAC 142 address input, based on a control signal 258 generated by arbiter 202.

Multiplexer 206 receives as inputs a redundant TA data signal 244 and a deadlock data signal 246, which are described in more detail below with respect to FIGS. 10–11 and 12–13, respectively. Multiplexer 206 also receives from BTAC write queue 144 as an input a BWQ data signal 248, which is the data of the current BTAC write queue 144 request for updating BTAC 142. Multiplexer 206 selects one of the three inputs to output on a data signal 256, which is provided to the BTAC 142 data input, based on a control signal 262 generated by arbiter 202.

Arbiter 202 arbitrates between a plurality of resources requesting access to BTAC 142. Arbiter 202 generates a signal 252 provided to the read/write input of BTAC 142 to control when BTAC 142 is read or written. Arbiter 202 receives a BTAC read request signal 212, which indicates a request to read BTAC 142 using current fetch address 162 in parallel with a read of instruction cache 104 also using current fetch address 162. Arbiter 202 also receives a redundant target address (TA) request signal 214, which indicates a request to invalidate a redundant entry in BTAC 142 for the same branch instruction in a set selected by redundant TA address 234, as described below. Arbiter 202 also receives a deadlock request signal 216, which indicates a request to invalidate an entry in BTAC 142 that mispredicted that a branch instruction in a set selected by deadlock address 236 did not wrap across a cache line boundary, as described below. Arbiter 202 also receives a BWQ not empty signal 218 from BTAC write queue 144, which indicates at least one request is pending to update an entry in BTAC 142 in a set selected by BWQ address 178, as described below. Arbiter 202 also receives a BWQ full signal 222 from BTAC write queue 144, which indicates that BTAC write queue 144 is full of pending requests to update an entry in BTAC 142 in a set selected by BWQ address 178, as described below.

In one embodiment, arbiter 202 assigns priority as shown in Table 1 below, where 1 is highest priority and 5 is lowest priority:

TABLE 1

| |
|---|
| 1  deadlock request 216 |
| 2  BWQ full 222 |
| 3  BTAC read request 212 |
| 4  redundant TA request 214 |
| 5  BWQ not empty 218 |

Figure 3:
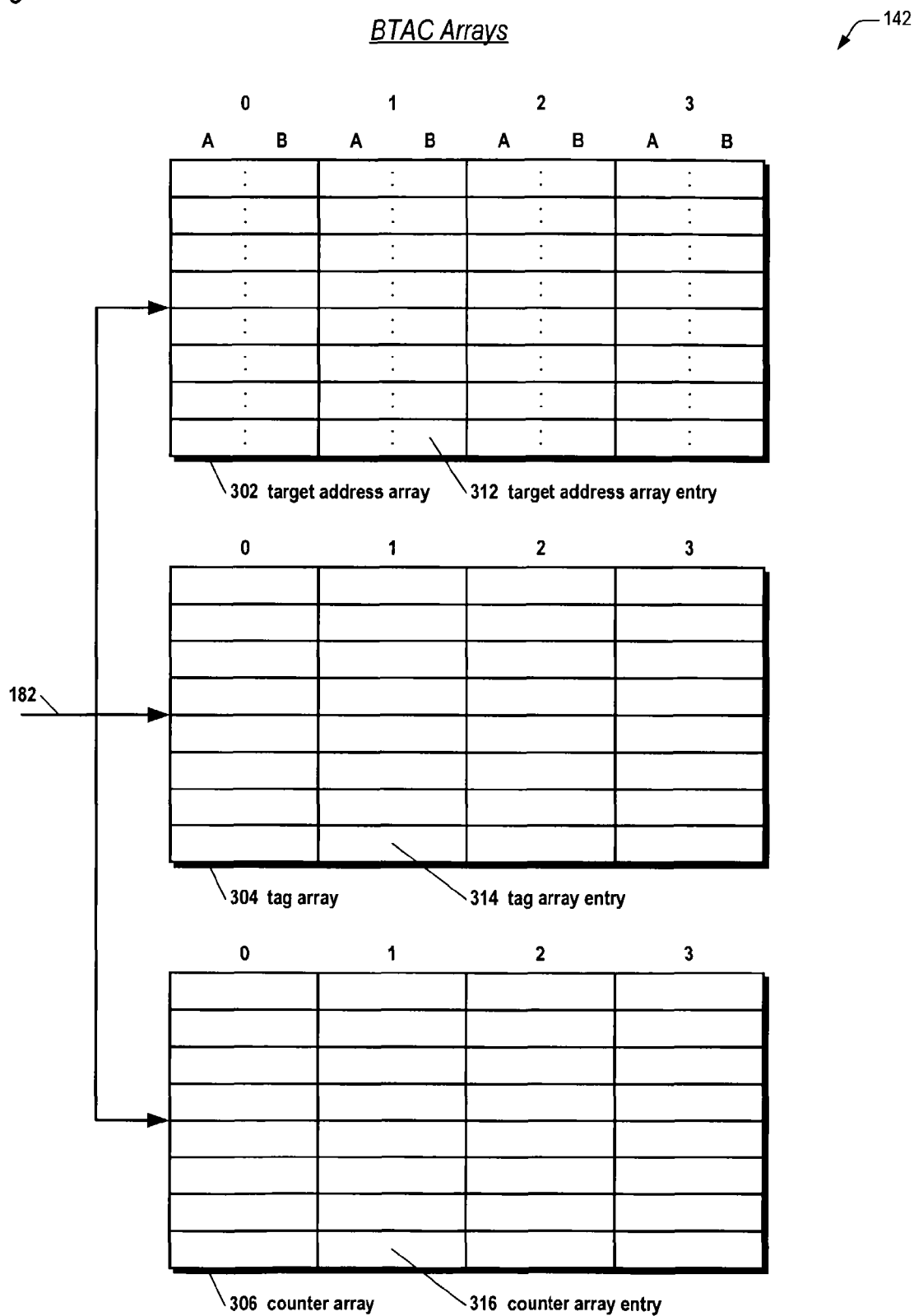
FIG. 3 is a block diagram illustrating in more detail the BTAC of FIG. 1 according to the present invention.

Referring now to FIG. 3, a block diagram illustrating in more detail BTAC 142 of FIG. 1 according to the present invention is shown. As shown in FIG. 3, BTAC 142 includes a target address array 302, a tag array 304, and a counter array 306. Each of the arrays 302, 304, and 306 receives address 182 of FIG. 1. The embodiment of FIG. 3 shows a 4-way set-associative BTAC 142 cache memory. In another embodiment, BTAC 142 comprises a 2-way set-associate cache memory. In one embodiment, target address array 302 and tag array 304 are single-ported; however, counter array 306 is dual-ported, having one read and one write port, since counter array 306 must be updated more frequently than target address array 302 and tag array 304.

Target address array 302 comprises an array of storage elements for storing target address array entries 312 for caching branch target addresses and related branch prediction information. The contents of a target address array entry 312 are described below with respect to FIG. 4. Tag array 304 comprises an array of storage elements for storing tag array entries 314 for caching address tags and related branch prediction information. The contents of a tag array entry 314 are described below with respect to FIG. 5. Counter array 306 comprises an array of storage elements for storing counter array entries 316 for storing branch outcome prediction information. The contents of a counter array entry 316 are described below with respect to FIG. 6.

Each of the target address array 302, tag array 304, and counter array 306 is organized into four ways, shown as way 0, way 1, way 2, and way 3. Preferably, each of the target address array 302 ways stores two entries, or portions, for caching a branch target address and speculative branch information, designated A and B, so that if two branch instructions are present in a cache line, BTAC 142 may make a prediction for the appropriate branch instruction.

Each of the arrays 302–306 is indexed by address 182 of FIG. 1. The lower significant bits of address 182 select a line within each of the arrays 302–306. In one embodiment, each of the arrays 302–306 comprises 128 sets. Hence, BTAC 142 is capable of caching up to 1024 target addresses, 2 for each of the 4 ways for each of the 128 sets. Preferably, the arrays 302–306 are indexed with bits [11:5] of address 182 to select a 4-way set within BTAC 142.

Figure 4:
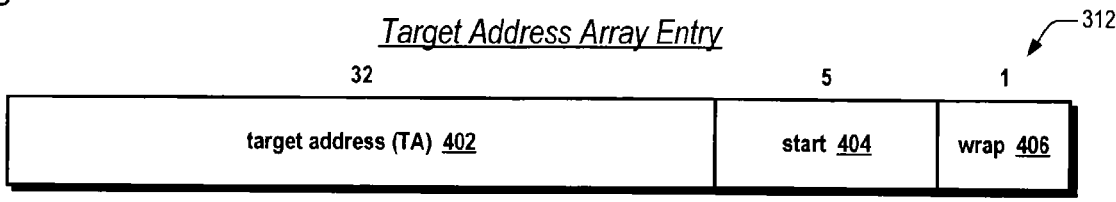
FIG. 4 is a block diagram showing the contents of a target address array entry of FIG. 3 according to the present invention.

Referring now to FIG. 4, a block diagram showing the contents of a target address array entry 312 of FIG. 3 according to the present invention is shown.

Target address array entry 312 includes a branch target address (TA) 402. In one embodiment, target address 402 comprises a 32-bit address, which is cached from a previous execution of a branch instruction. BTAC 142 provides target address 402 on predicted TA output 164.

Target address array entry 312 also includes a start field 404. Start field 404 specifies the byte offset of the first byte of the branch instruction within a cache line output by instruction cache 104 in response to current fetch address 162. In one embodiment, a cache line comprises 32 bytes; hence, start field 404 comprises 5 bits.

Target address array entry 312 also includes a wrap bit 406. Wrap bit 406 is true if the predicted branch instruction wraps across two cache lines of instruction cache 104. BTAC 142 provides wrap bit 406 on a B_wrap signal 1214 discussed below with respect to FIG. 12.

Figure 5:
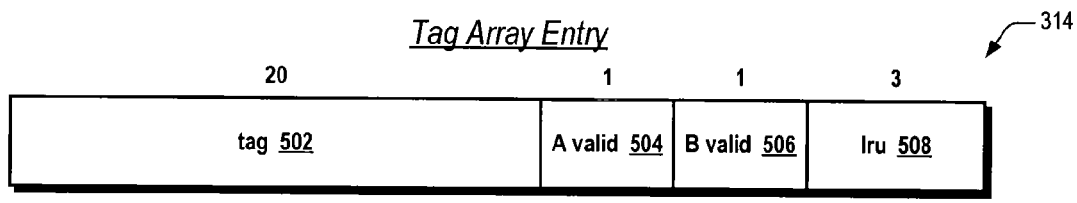
FIG. 5 is a block diagram showing the contents of a tag array entry of FIG. 3 according to the present invention.

Referring now to FIG. 5, a block diagram showing the contents of a tag array entry 314 of FIG. 3 according to the present invention is shown.

Tag array entry 314 includes a tag 502. In one embodiment, tag 502 comprises the upper 20 bits of the address of the branch instruction for which the corresponding entry in target address array 302 stores a predicted target address 402.) BTAC 142 compares tags 502 with the upper 20 bits of address 182 of FIG. 1 to determine whether the entry matches address 182, i.e., whether address 182 hits in BTAC 142, if the entry is valid.

Tag array entry 314 also includes an A valid bit 504, which is true if the target address 402 in the A portion of the corresponding entry in target address array 302 is valid. Tag array entry 314 also includes a B valid bit 506, which is true if the target address 402 in the B portion of the corresponding entry in target address array 302 is valid.

Tag array entry 314 also includes a three-bit lru field 508, which specifies which of the four ways of the selected set is least recently used. In one embodiment, BTAC 142 only updates lru field 508 when a BTAC branch is performed. That is, BTAC 142 updates lru field 508 only when BTAC 142 predicts a branch instruction will be taken, and microprocessor 100 branches to the predicted target address 164 provided by BTAC 142 based on the prediction. BTAC 142 updates lru field 508 when the BTAC branch is being performed, during which time BTAC 142 is not being read, and does not require utilizing BTAC write queue 144.

Figure 6:
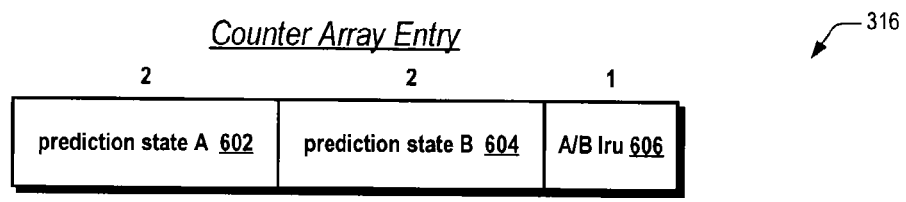
FIG. 6 is a block diagram showing the contents of a counter array entry of FIG. 3 according to the present invention.

Referring now to FIG. 6, a block diagram showing the contents of a counter array entry 316 of FIG. 3 according to the present invention is shown.

Counter array entry 316 includes a prediction state A counter 602. In one embodiment, prediction state A counter 602 is a two-bit saturating counter that counts up each time microprocessor 100 determines the associated branch instruction is taken, and counts down each time the associated branch instruction is not taken. Prediction state A counter 602 saturates at a binary value b'11 when counting up and saturates at a binary value of b'00 when counting down. In one embodiment, if the value of prediction state A counter 602 is b'11 or b'10, then BTAC 142 predicts the branch instruction associated with the A portion of selected target address array entry 312 is taken; otherwise, BTAC 142 predicts the branch instruction is not taken. Counter array entry 316 also includes a prediction state B counter 604, which operates similarly to prediction state A counter 602, but with respect to the B portion of the selected target address array entry 312.

Counter array entry 316 also includes an A/B lru bit 606. A binary value of b'1 in A/B lru bit 606 indicates the A portion of the selected target address array entry 312 is least recently used; otherwise, the B portion of the selected target address array entry 312 is least recently used. In one embodiment, A/B lru bit 606 is updated, along with prediction state A and B counters 602 and 604, when the branch instruction reaches the store stage 128 where the branch outcome (i.e., whether the branch is take or not taken) is determined. In one embodiment, updating counter array entry 316 does not require utilizing BTAC write queue 144 since counter array 306 includes a read port and a write port, as described above with respect to FIG. 3.

Figure 7:
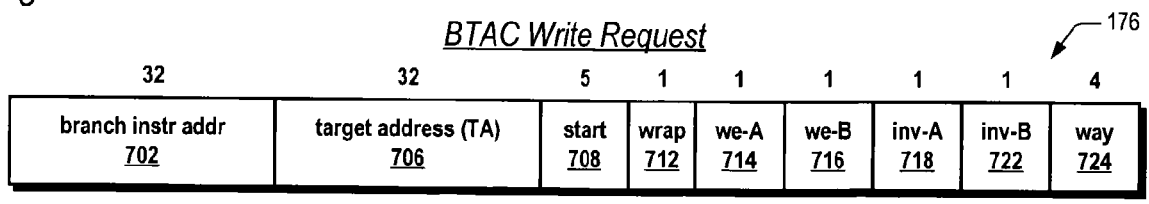
FIG. 7 is a block diagram showing the contents of a BTAC write request of FIG. 1 according to the present invention.
Figure 8:
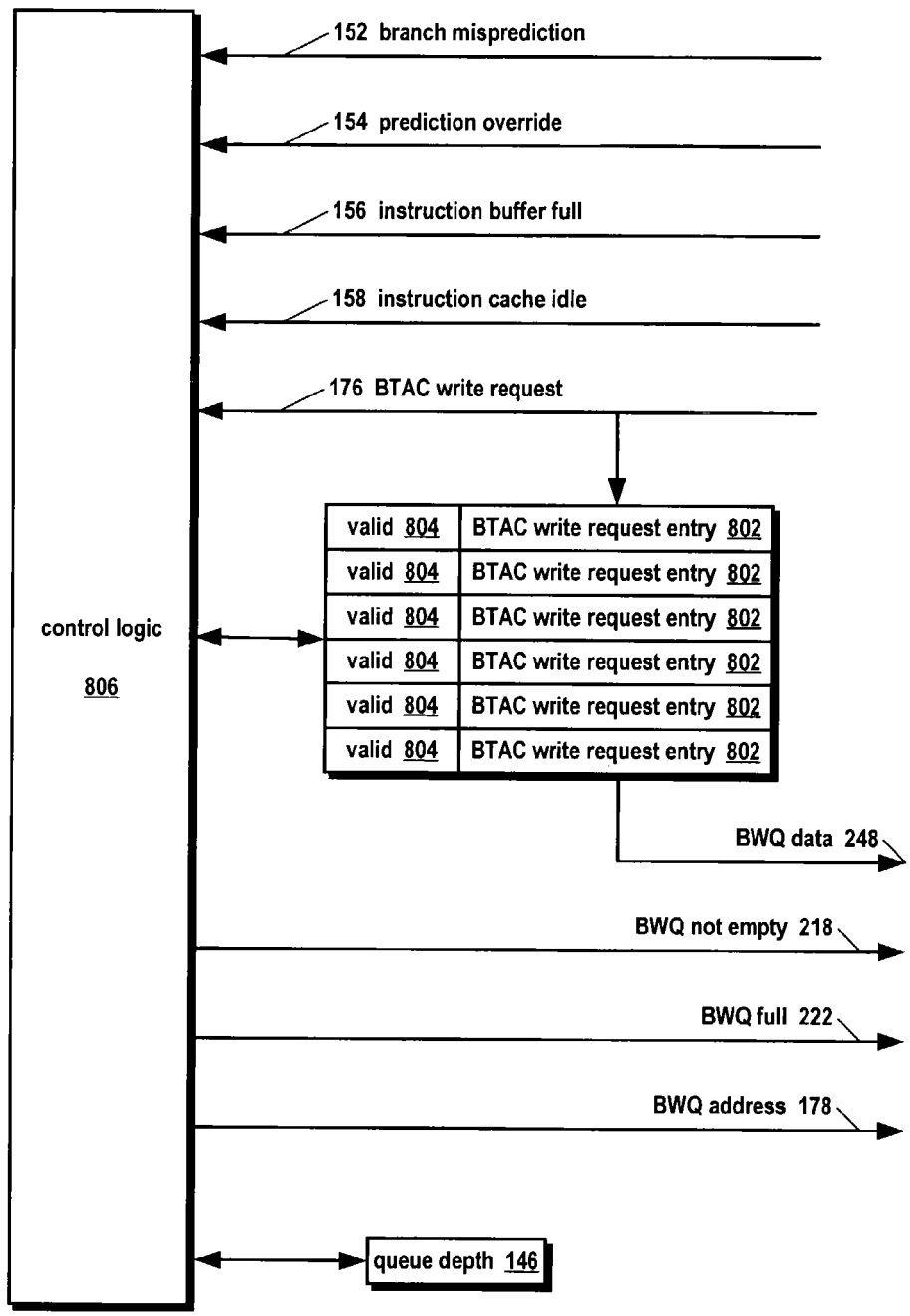
FIG. 8 is a block diagram illustrating the BTAC write queue of FIG. 1 according to the present invention.

Referring now to FIG. 7, a block diagram showing the contents of a BTAC write request 176 of FIG. 1 according to the present invention is shown. FIG. 7 shows the information for updating a BTAC 142 entry generated by store stage 128 on BTAC write request signal 176 provided to BTAC write queue 144, which is also the contents of an entry stored in BTAC write queue 144, as shown in FIG. 8.

BTAC write request 176 includes a branch instruction address field 702, which is the address of a previously executed branch instruction for which the BTAC 142 is to be updated. The upper 20 bits of the branch instruction address 702 is stored into the tag field 502 of tag array entry 314 of FIG. 5 when the write request 176 subsequently updates BTAC 142. The lower 7 bits {11:5} of the branch instruction address 702 are used as an index into BTAC 142. In one embodiment, branch instruction address 702 is a 32-bit field.

BTAC write request 176 also includes a target address 706, for storing in target address field 402 of FIG. 4.

BTAC write request 176 also includes a start field 708, for storing in start field 404 of FIG. 4. BTAC write request 176 also includes a wrap bit 712, for storing in wrap bit 406 of FIG. 4.

BTAC write request 176 also includes a write-enable-A field 714, which specifies whether to update the A portion of the selected target address array entry 312 with the information specified in BTAC write request 176. BTAC write request 176 also includes a write-enable-B field 716, which specifies whether to update the B portion of the selected target address array entry 312 with the information specified in BTAC write request 176.

BTAC write request 176 also includes an invalidate-A field 718, which specifies whether to invalidate the A portion of the selected target address array entry 312. Invalidating the A portion of the selected target address array entry 312 comprises clearing the A valid bit 504 of FIG. 5. BTAC write request 176 also includes an invalidate-B field 722, which specifies whether to invalidate the B portion of the selected target address array entry 312. Invalidating the B portion of the selected target address array entry 312 comprises clearing the B valid bit 506 of FIG. 5.

BTAC write request 176 also includes a 4-bit way field 724, which specifies which of the four ways of the selected set to update. Way field 724 is fully decoded. In one embodiment, when microprocessor 100 reads BTAC 142 to obtain a branch prediction, microprocessor 100 determines the value to be populated in way field 724 and forwards the value down through the pipeline stages to store stage 128 for inclusion with BTAC write request 176. If microprocessor 100 is updating an existing entry in BTAC 142, e.g., if current fetch address 162 hits in BTAC 142, microprocessor 100 populates way field 724 with the way of the existing entry. If microprocessor 100 is writing a new entry in BTAC 142, e.g., for a new branch instruction, microprocessor 100 populates way field 724 with the least recently used way of the selected BTAC 142 set. In one embodiment, microprocessor 100 determines the least recently used way from lru field 508 of FIG. 5 when it reads BTAC 142 to obtain the branch prediction.

Referring now to FIG. 8, a block diagram illustrating BTAC write queue 144 of FIG. 1 according to the present invention is shown.

BTAC write queue 144 includes a plurality of storage elements 802 for storing BTAC write requests 176 of FIG. 7. In one embodiment, BTAC write queue 144 comprises six storage elements 802 for storing six BTAC write requests 176, as shown.

BTAC write queue 144 also includes a valid bit 804 associated with each BTAC write request entry 802, which is true if the corresponding entry is valid and false if the entry is invalid.

BTAC write queue 144 also includes control logic 806, coupled to storage elements 802 and valid bits 804. Control logic 806 is also coupled to queue depth register 146. Control logic 806 increments queue depth 146 when a BTAC write request 176 is loaded into BTAC write queue 144 and decrements queue depth 146 when a BTAC write request 176 is shifted out of BTAC write queue 144. Control logic 806 receives BTAC write request signal 176 from store stage 128 of FIG. 1 and stores the requests received thereon into entries 802. Control logic 806 also receives branch misprediction signal 152, prediction override signal 154, instruction buffer full signal 156, and instruction cache idle signal 158 of FIG. 1. Control logic 806 generates a true value on BWQ not empty signal 218 of FIG. 2 whenever queue depth 146 is greater than zero. Control logic 806 generates a true value on BWQ full signal 222 of FIG. 2 whenever the value of queue depth 146 equals the total number of entries 802, which is six in the embodiment shown in FIG. 8. When control logic 806 generates a true value on BWQ not empty 218, control logic 806 also provides on BWQ address signal 178 of FIG. 1 the branch instruction address 702 of FIG. 7 of the oldest, or bottom, entry 802 of BTAC write queue 144. Additionally, when control logic 806 generates a true value on BWQ not empty 218, control logic 806 also provides on BWQ data signal 248 fields 706 through 724 of FIG. 7 of the oldest, or bottom, entry 802 of BTAC write queue 144.

Figure 9:
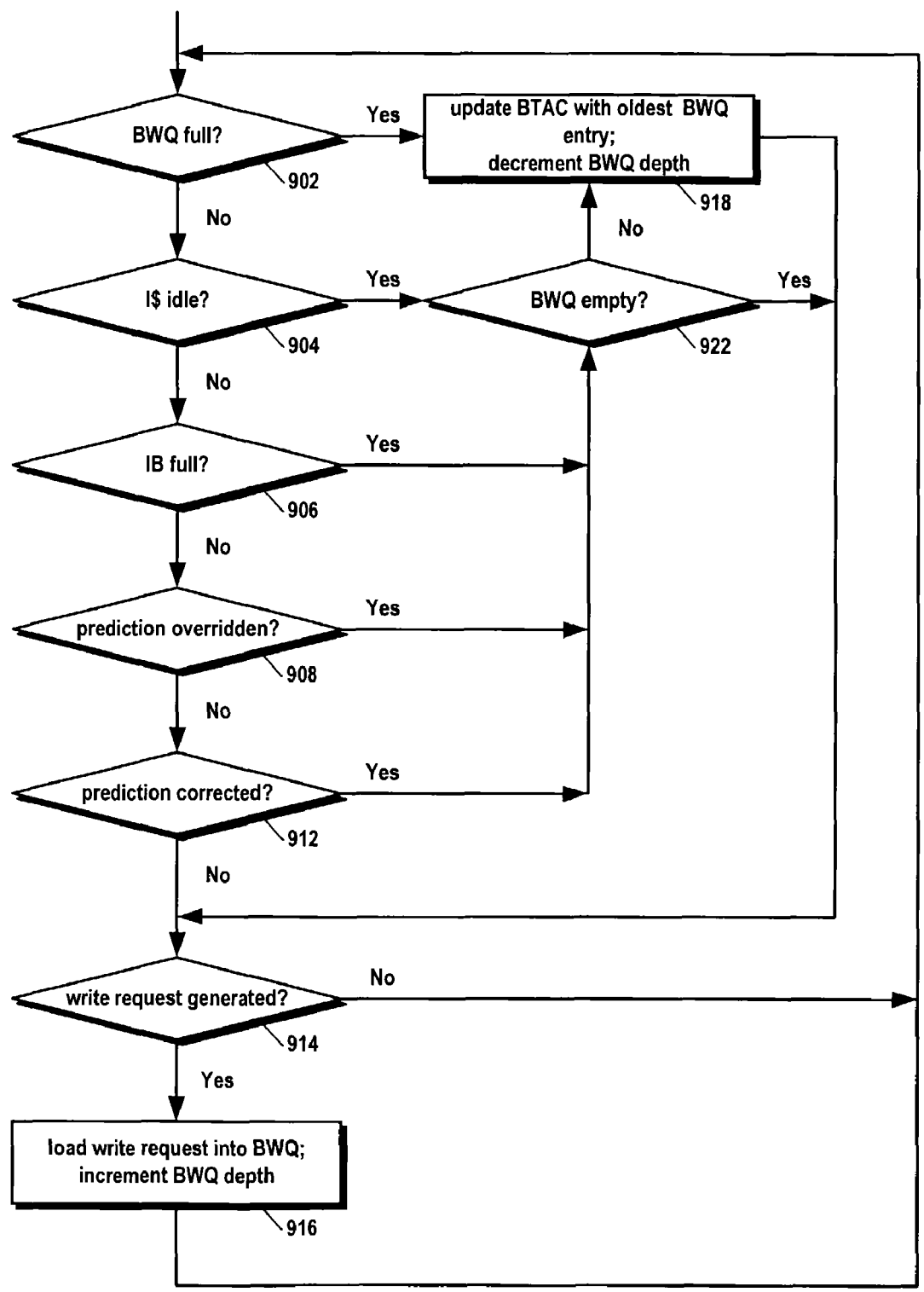
FIG. 9 is a flowchart illustrating operation of the BTAC write queue of FIG. 1 according to the present invention.

Referring now to FIG. 9, a flowchart illustrating operation of BTAC write queue 144 of FIG. 1 according to the present invention is shown. Flow begins at decision block 902.

At decision block 902, BTAC write queue 144 determines whether it is full by determining whether the queue depth 146 of FIG. 1 is equal to the total number of entries in BTAC write queue 144. If so, flow proceeds to block 918 to update BTAC 142; otherwise, flow proceeds to decision block 904.

At decision block 904, BTAC write queue 144 determines whether instruction cache 104 of FIG. 1 is idle by examining instruction cache idle signal 158. If so, flow proceeds to decision block 922 to update BTAC 142 if necessary since BTAC 142 is likely not being read; otherwise, flow proceeds to decision block 906.

At decision block 906, BTAC write queue 144 determines whether instruction buffer 106 of FIG. 1 is full by examining instruction buffer full signal 156. If so, flow proceeds to decision block 922 to update BTAC 142 if necessary since BTAC 142 is likely not being read; otherwise, flow proceeds to decision block 908.

At decision block 908, BTAC write queue 144 determines whether a BTAC 142 branch prediction has been overridden by examining prediction overridden signal 154. If so, flow proceeds to decision block 922 to update BTAC 142 if necessary since BTAC 142 is likely not being read; otherwise, flow proceeds to decision block 912.

At decision block 912, BTAC write queue 144 determines whether a BTAC 142 branch prediction has been corrected by examining branch misprediction signal 152. If so, flow proceeds to decision block 922 to update BTAC 142 if necessary since BTAC 142 is likely not being read; otherwise, flow proceeds to decision block 914.

At decision block 914, BTAC write queue 144 determines whether a BTAC write request 176 has been generated. If not, flow returns to decision block 902; otherwise, flow proceeds to block 916.

At block 916, BTAC write queue 144 loads the BTAC write request 176 and increments queue depth 146. The BTAC write request 176 is loaded into the top entry in BTAC write queue 144 that is not valid, and then the entry is marked valid. Flow returns to decision block 902.

At block 918, BTAC write queue 144 updates BTAC 142 with the oldest, or bottom, entry in BTAC write queue 144, and decrements queue depth 146. The BTAC write queue 144 is then shifted down one entry. BTAC write queue 144 updates BTAC 142 with the oldest entry in BTAC write queue 144 by providing on BWQ address signal 178 the value of branch instruction address field 702 of FIG. 7 of the oldest entry, and providing the remainder of the oldest BTAC write request 176 entry on BWQ data signal 248. Additionally, BTAC write queue 144 asserts a true value on BWQ not empty signal 218 to arbiter 202 of FIG. 2. BTAC write queue 144 also asserts a true value on BWQ full signal 222 to arbiter 202 of FIG. 2, if block 918 was arrived at from decision block 902. Flow proceeds from block 918 to decision block 914.

It is noted that if BTAC write queue 144 asserts the BWQ full signal 222 and arbiter 202 grants BTAC write queue 144 access to BTAC 142 during a cycle in which BTAC read request signal 212 is also pending, then BTAC 142 will signal a miss, which may be a false miss if in fact a valid target address was present in BTAC 142 for a branch instruction predicted taken by BTAC 142 in the cache line specified by current fetch address 162. However, advantageously, BTAC write queue 144 reduces the likelihood of a false miss in BTAC 142, by enabling writes of BTAC 142 to be delayed in most cases until BTAC 142 is not being read, as may be seen from FIG. 9.

At decision block 922, control logic 806 determines whether BTAC write queue 144 is empty by determining whether the queue depth 146 is equal to zero. If so, flow proceeds to decision block 914; otherwise, flow proceeds to block 918 to update BTAC 142 if necessary since BTAC 142 is likely not being read.

Figure 10:
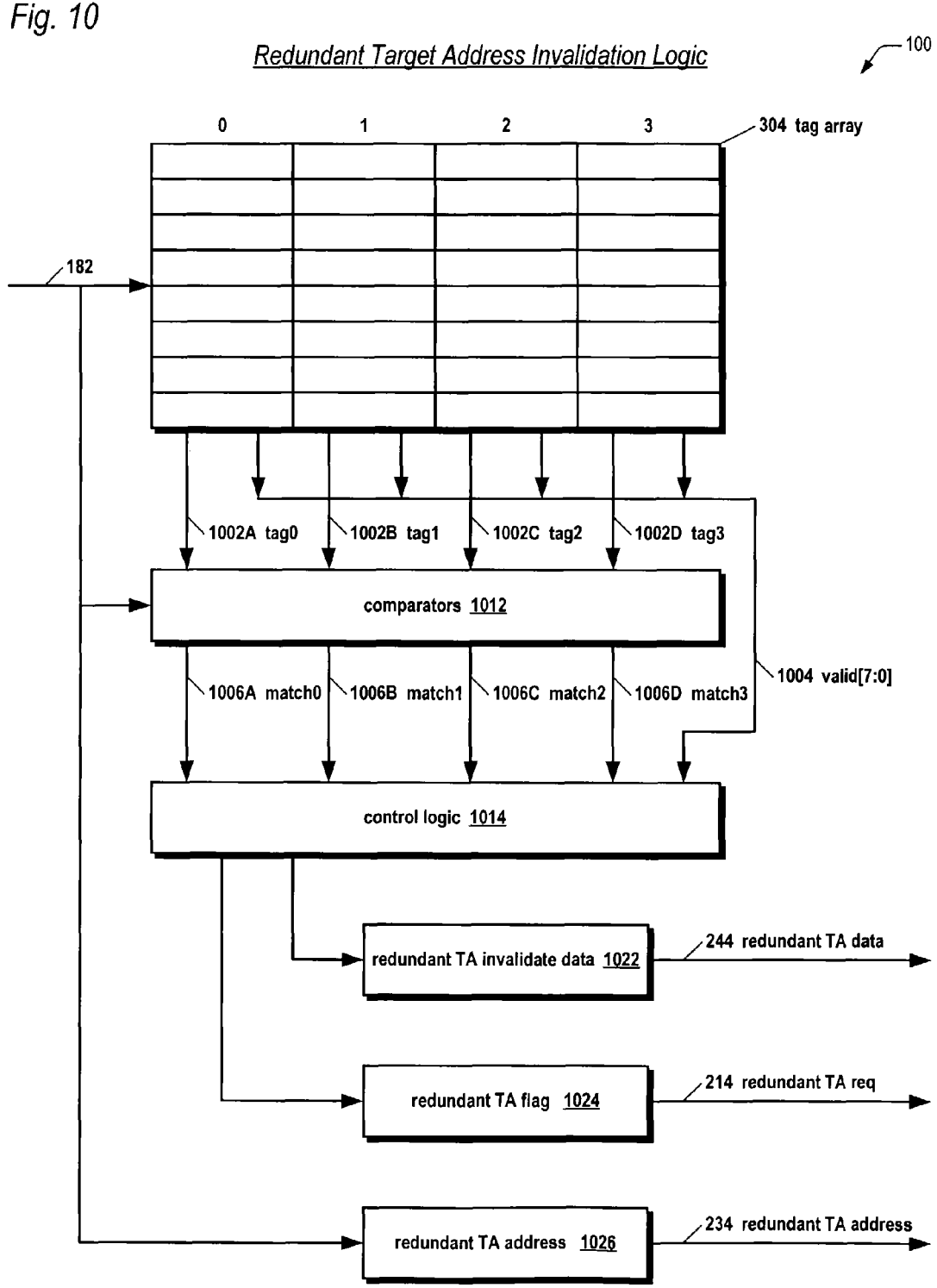
FIG. 10 is a block diagram illustrating logic within the microprocessor for invalidating a redundant target address in the BTAC of FIG. 1 according to the present invention.

Referring now to FIG. 10, a block diagram illustrating logic within microprocessor 100 for invalidating a redundant target address in BTAC 142 of FIG. 1 according to the present invention is shown.

FIG. 10 shows BTAC 142 tag array 304 of FIG. 3 receiving address 182 of FIG. 1 and responsively generating four tags, denoted tag0 1002A, tag1 1002B, tag2 1002C, and tag3 1002D, referred to collectively as tags 1002. Tags 1002 comprise one tag 502 of FIG. 5 from each of the four ways of tag array 304. Additionally, tag array 304 responsively generates eight valid[7:0] bits denoted 1004, which are A valid bit 504 and B valid bit 506 from each of the four ways of tag array 304.

Microprocessor 100 also includes comparators 1012, coupled to tag array 304, that receive address 182. In the embodiment of FIG. 10, comparators 1012 comprise four 20-bit comparators each for comparing the upper 20 bits of address 182 with a respective one of tags 1002 to generate four respective match signals, match0 1006A, match1 1006B, match2 1006C, and match3 1006D, referred to collectively as 1006. If address 182 matches the respective one of tags 1002, then the respective comparator 1012 generates a true value on respective match signal 1006.

Microprocessor 100 also includes control logic 1014, coupled to comparators 1012, that receives match signals 1006 and valid signals 1004. If more than one of the ways of the selected set of tag array 304 has a true match signal 1006 and at least one true valid bit 1004, then control logic 1014 stores a true value in a redundant TA flag register 1024 to indicate that a condition exists in which more than one valid target address is stored in BTAC 142 for the same branch instruction. Additionally, control logic 1014 causes address 182 to be loaded into a redundant TA register 1026. Finally, control logic 1014 loads redundant TA invalidate data into a redundant TA invalidate data register 1022. In one embodiment, the data stored in redundant TA invalidate data register 1022 is similar to a BTAC write request 176 of FIG. 7, except branch instruction address 702 is not stored because the address of the branch instruction is stored in redundant TA address register 1026; and target address 706, start bits 708, and wrap bit 712 are not stored because they are don't cares in an invalid BTAC 142 entry; therefore, target address array 302 is not written when a redundant TA invalidate is performed, rather only the tag array 304 is updated to invalidate the redundant BTAC 142 entries. The output of redundant TA invalidate data register 1022 comprises redundant TA data signal 244 of FIG. 2. The output of redundant TA flag register 1024 comprises redundant TA request 214 of FIG. 2. The output of redundant TA address register 1026 comprises redundant TA address 234 of FIG. 2. In one embodiment, the equations for generating the way value 724 stored in redundant TA invalidate data register 1022 and redundant TA flag register 1024 are shown in Table 2 below. In Table 2, valid[3] comprises the logical OR of A valid[3] 504 and B valid[3] 506; valid[2] comprises the logical OR of A valid[2] 504 and B valid[2] 506; valid[1] comprises the logical OR of A valid[1] 504 and B valid[1] 506; and valid[0] comprises the logical OR of A valid[0] 504 and B valid[0] 506.

TABLE 2 redundantInvalWay[3] = (valid[3] & match[3]) & ((valid[0] & match[0]) | (valid[1] & match[1]) | (valid[2] & match[2]));
redundantInvalWay[2] = (valid[2] & match[2]) & ((valid[0] & match[0]) | (valid[1] & match[1]));
redundantInvalWay[1] = (valid[1] & match[1]) & (valid[0] & match[0]);
redundantInvalWay[0] = 0; /* way 0 is never invalidated */
redundantTAFlag = ((valid[3] & match[3]) & (valid[2] & match[2])) |
((valid[3] & match[3]) & (valid[1] & match[1])) |
((valid[3] & match[3]) & (valid[0] & match[0])) |
((valid[2] & match[2]) & (valid[1] & match[1])) |
((valid[2] & match[2]) & (valid[0] & match[0])) |
((valid[1] & match[1]) & (valid[0] & match[0]));

In order to appreciate the operation of redundant target address invalidation logic of FIG. 10 as described in FIG. 11 below, a sequence of instruction executions will now be described as an example that could create redundant target address entries in BTAC 142 for the same branch instruction.

A first current fetch address 162 of FIG. 1 is applied to instruction cache 104 and BTAC 142. The cache line selected by the first current fetch address 162 includes a branch instruction, referred to as branch-A. The first current fetch address 162 selects a set in BTAC 142, referred to as set N. None of the tags 1002 in the ways of set N match the first current fetch address 162; consequently, BTAC 142 generates a miss. In the example, the least recently used way indicated by lru value 508 is 2. Consequently, information for updating BTAC 142 upon resolution of branch-A is sent down the pipeline along with branch-A indicating way 2 should be updated.

Next, a second, current fetch address 162 is applied to instruction cache 104 and BTAC 142. The cache line selected by the second current fetch address 162 includes a branch instruction, referred to as branch-B. The second current fetch address 162 also selects set N and hits in way 3 of set N; consequently, BTAC 142 generates a hit. Additionally, BTAC 142 updates lru value 508 for set N to way 1.

Next, because branch-A is part of a tight loop of code, the first current fetch address 162 is applied again to instruction cache 104 and BTAC 142, and again selects set N. Because the first execution of branch-A has not reached the store stage 128 of FIG. 1, BTAC 142 has not been updated with the target address of branch-A. Consequently, BTAC 142 generates a miss again. However, this time the least recently used way, indicated by lru value 508 is 1, since the lru 508 was updated in response to the, hit of branch-B. Consequently, information for updating BTAC 142 upon resolution of the second execution of branch-A is sent down the pipeline along with the second instance of branch-A indicating way 1 should be updated.

Next, the first branch-A reaches the store stage 128 and generates a BTAC write request 176 to update way 2 of set N with the target address of branch-A, which is subsequently performed.

Next, the second branch-A reaches the store stage 128 and generates a BTAC write request 176 to update way 1 of set N with the target address of branch-A, which is subsequently performed. As a result, two valid entries exist in BTAC 142 for the same branch instruction, branch-A. One of the entries is redundant and causes inefficient use of BTAC 142 since the redundant entry could be used for another branch instruction and/or may have evicted, a valid target address for another branch instruction.

Figure 11:
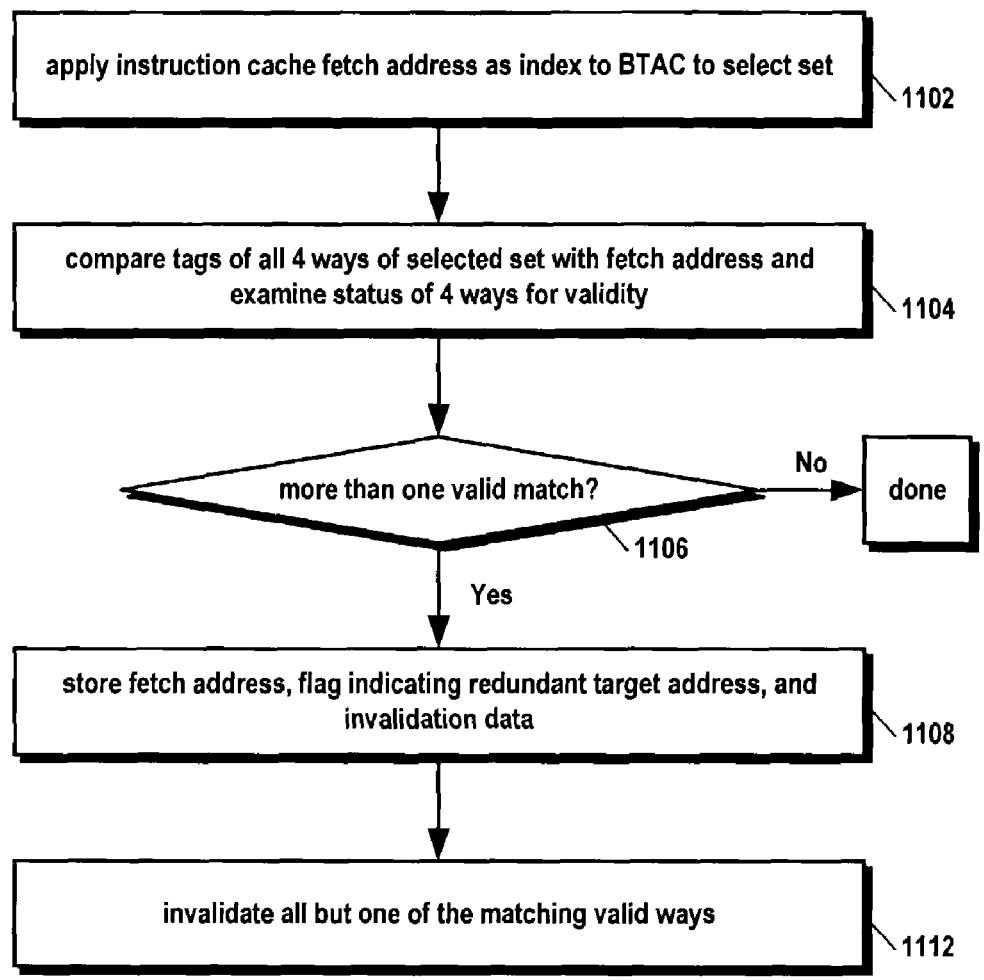
FIG. 11 is a flowchart illustrating operation of the redundant target address apparatus of FIG. 10 according to the present invention.

Referring now to FIG. 11, a flowchart illustrating operation of the redundant target address apparatus of FIG. 10 according to the present invention is shown. Flow begins at block 1102.

At block 1102, arbiter 202 grants BTAC read request 212 of FIG. 2 access to BTAC 142 causing multiplexer 148 to select current fetch address 162 for provision on address signal 182 of FIG. 1 and generating control signal 252 of FIG. 2 to indicate a read of BTAC 142. Consequently, the lower significant bits of current fetch address 162 function via address 182 as an index to select a set of BTAC 142. Flow proceeds to block 1104.

At block 1104, comparators 1012 compare tags 1002 of FIG. 10 of all four ways of the selected BTAC-142 set with the upper significant, bits of current fetch address 162 provided on address signal 182 to generate match signals 1006 of FIG. 10. Control logic, 1014 receives match signals 1006 and valid bits 1004 of FIG. 10. Flow proceeds to decision block 1106.

At decision block 1106, control logic 1014 determines whether more than one valid tag match occurred. That is, control logic 1014 determines whether two or more of the ways in the BTAC 142 set selected by current fetch address 162 has a valid matching tag 1002 according to valid bits 1004 and match signals 0.1006. If so, flow proceeds to block 1108; otherwise, flow ends.

At block 1108, control logic 1014 stores a true value in redundant TA flag register 1024, stores address 182 into redundant TA address register 1026, and stores invalidate data in redundant TA invalidate data register 1022. In particular, control logic 1014 stores a true value for we-A 714, we-B 716, inv-A 718, and inv-B 722 into redundant TA invalidate data register 1022. Additionally, control logic 1014 stores a value into way field 724 according to Table 2 described above with respect to FIG. 10 into redundant TA invalidate data register 1022. Flow proceeds to block 1112.

At block 1112, arbiter 202 grants to redundant TA request 214 of FIG. 2 access to BTAC 142 causing multiplexer 148 to select redundant TA address 234 for provision on address signal 182 and generating control signal 252 of FIG. 2 to indicate a write of BTAC 142. Consequently, the lower significant bits of redundant TA address 234 function via address 182 as an index to select a set of BTAC 142. BTAC 142 receives the data from redundant TA data signal 244 provided by redundant TA data register 1022 and invalidates the ways specified by way field 724 in the selected set. Flow ends at block 1112.

Referring now to FIG. 12, a block diagram illustrating deadlock avoidance logic within microprocessor 100 according to the present invention is shown.

FIG. 12 shows BTAC 142, instruction cache 104, instruction buffer 106, instruction formatter 108, formatted instruction queue 112, and multiplexer 136 of FIG. 1 and control logic 1014 of FIG. 10.

As shown in FIG. 12, microprocessor 100 also includes a deadlock invalidate data register 1222, a deadlock flag register 1224, and a deadlock address register 1226.

Instruction formatter 108 decodes instructions stored in instruction buffer 106 and generates a true value on an F_wrap signal 1202 if instruction formatter 108 decodes a branch instruction that wraps across two cache lines. In particular, instruction formatter 108 generates a true value on an F_wrap signal 1202 if instruction formatter 108 decodes a branch instruction that wraps across two cache lines upon decoding the first portion of a wrapping branch instruction in a first cache line stored in instruction buffer 106, regardless of whether instruction formatter 108 has decoded the remainder of the wrapping branch instruction which is in the second cache line that may not yet be present in instruction buffer 106. F_wrap signal 1202 is provided to control logic 1014.

Instruction cache 104 generates a true value on a miss signal 1206 when current fetch address 162 misses therein. Miss signal 1206 is provided to control logic 1014.

Control logic 1014 generates a true value on a speculative signal 1208 when the current fetch address 162 provided to instruction cache 104 is speculative, i.e., when current fetch address 162 is a predicted address, such as when multiplexer 136 selects BTAC predicted target address 164 as current fetch address 162. Speculative signal 1208 is provided to instruction cache 104. In one embodiment, instruction cache 104 forwards speculative signal 1208 on to instruction fetcher 102 of FIG. 1 so that instruction fetcher 102 foregoes fetching from memory a cache line missing in instruction cache 104 at a speculative memory address for reasons discussed below with respect to FIG. 13.

BTAC 142 generates a taken/not taken (T/NT) signal 1212 that is provided to control logic 1014. A true value on T/NT signal 1212 indicates that address 182 hit in BTAC 142, that BTAC 142 is predicting a branch instruction is contained in the cache line provided by instruction cache 104 in response to current fetch address 162, that the branch instruction will be taken, and that BTAC 142 is providing a target address of the branch instruction on BTAC predicted target address signal 164. BTAC 142 generates T/NT signal 1212 based on the value of prediction state A 602 or prediction state B 604 of FIG. 6, depending upon whether portion A or B was used by BTAC 142 in making the branch prediction.

BTAC 142 also generates a B_wrap signal 1214 that is provided to control logic 1014. The value of wrap bit 406 of FIG. 4 of the selected BTAC target address array entry 312 is provided on B_wrap signal 1214. Hence, a false value on B_wrap signal 1214 indicates that BTAC 142 predicts the branch instruction does not wrap across two cache lines. In one embodiment, control logic 1014 registers B_wrap signal 1214 to retain the value of B_wrap 1214 from the previous BTAC 142 access.

Control logic 1014 also generates current instruction pointer 168 of FIG. 1. Control logic 1014 also generates a control signal 1204 which is the input select signal to multiplexer 136.

If control logic 1014 detects a deadlock situation described in more detail below (namely a false value on registered B_wrap signal 1214, and a true value on F_wrap signal 1202, miss signal 1206, and speculative signal 1208), then control logic 1014 stores a true value in a deadlock flag register 1224 to indicate that a deadlock condition exists so the entry in BTAC 142 that caused the deadlock condition will be invalidated. Additionally, control logic 1014 causes address 182 to be loaded into a deadlock address register 1226. Finally, control logic 1014 loads deadlock invalidate data into deadlock invalidate data register 1222. In one embodiment, the data stored in deadlock invalidate data register 1222 is similar to a BTAC write request 176 of FIG. 7, except branch instruction address 702 is not stored because the address of the branch instruction is stored in deadlock address register 1226; and target address 706, start bits 708, and wrap bit 712 are not stored because they are don't cares in an invalid BTAC 142 entry; therefore, target address array 302 is not written when a deadlock invalidate is performed, rather only the tag array 304 is updated to invalidate the mispredicting BTAC 142 entry. The output of deadlock invalidate data register 1222 comprises deadlock data signal 246 of FIG. 2. The output of deadlock flag register 1224 comprises deadlock request 216 of FIG. 2. The output of deadlock address register 1226 comprises deadlock address 236 of FIG. 2. The way value 724 stored in deadlock invalidate data register 1222 is populated with the way of the BTAC 142 entry that caused the deadlock situation.

If control logic 1014, detects the deadlock situation, then after invalidating the mispredicting entry, control logic 1014 also generates a value on control signal 1204 to cause multiplexer 136 to select current instruction pointer 168 to cause microprocessor 100 to branch thereto, so that the cache line containing the mispredicted branch instruction can be re-fetched.

Figure 13:
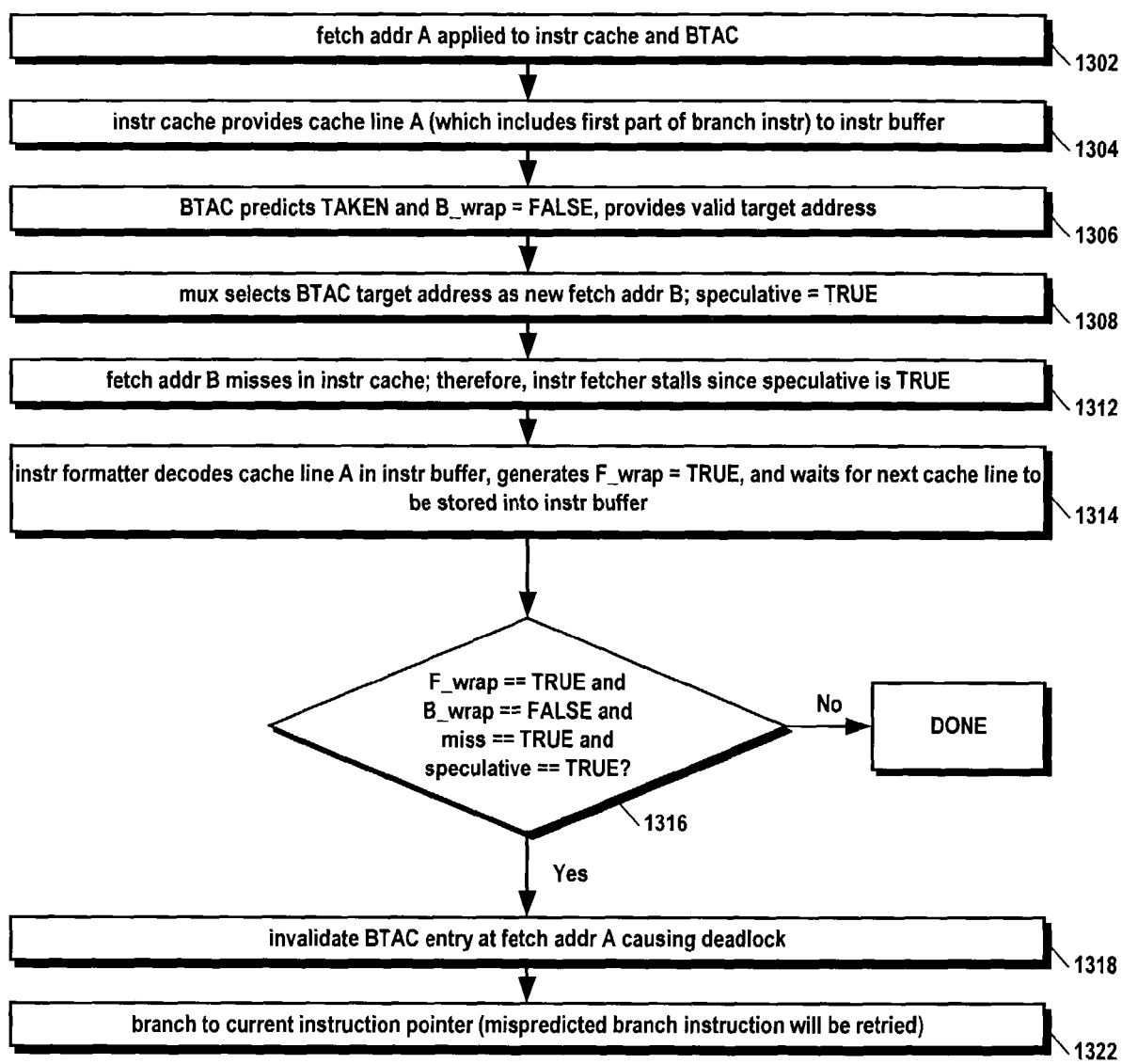
FIG. 13 is a flowchart illustrating operation of the deadlock avoidance logic of FIG. 12 according to the present invention.

Referring now to FIG. 13, a flowchart illustrating operation of the deadlock avoidance logic of FIG. 12 according to the present invention is shown. Flow begins at block 1302.

At block 1302, current fetch address 162 is applied to instruction cache 104 and to BTAC 142 via address signal 182. The current fetch address 162 is referred to as fetch address A in FIG. 13. Flow proceeds to block 1304.

At block 1304, instruction cache 104 provides to instruction buffer 106 a cache line specified by fetch address A, referred to as cache line A, which includes a first portion of a branch instruction, but not all of the branch instruction. Flow proceeds to block 1306.

At block 1306, in response to fetch address A, BTAC 1422 predicts the branch instruction in cache line A will be taken on T/NT signal 1212, generates a false value on B_wrap signal 1214, and provides a speculative target address on BTAC predicted target address 164. Flow proceeds to block 1308.

At block 1308, control logic 1014 controls multiplexer 136 to select BTAC predicted target address 164 as the next current fetch address 162, referred to as fetch address B. Control logic 1014 also generates a true value on speculative signal 1208, since BTAC predicted target address 164 is speculative. Flow proceeds to block 1312.

At block 1312, instruction cache 104 generates a true value on miss signal 1206 to indicate fetch address B misses in instruction cache 104. Normally, instruction fetcher 102 would fetch the missing cache line from memory; however, because speculative signal 1208 is true, instruction formatter 108 does not fetch the missing cache line from memory for reasons discussed below. Flow proceeds to block 1314.

At block 1314, instruction formatter 108 decodes cache line A in instruction buffer 106 and generates a true value on F_wrap signal 1202 since the branch instruction wraps across two cache lines. Instruction formatter 108 waits for the next cache line to be stored into instruction buffer 106 so that it can finish formatting the branch instruction for provision to formatted instruction queue 112. Flow proceeds to decision block 1316.

At decision block 1316, control logic 1014 determines whether the registered version of B_wrap signal 1214 is false and F_wrap signal 1202 is true and miss signal 1206 is true and speculative signal 1208 is true, which comprises a deadlock situation as discussed below. If so, flow proceeds to block 1318; otherwise, flow ends.

At block 1318, control logic 1014 invalidates the BTAC 142 entry causing the deadlock situation, as described above with respect to FIG. 12. Consequently, the next time fetch address A is applied to BTAC 142, BTAC 142 will generate a miss, since the entry causing the deadlock situation is now invalid. Flow proceeds to block 1322.

At block 1322, control logic 1014 controls multiplexer 136 to branch to current instruction pointer 168, as described above with respect to FIG. 12. Additionally, control logic 1014 generates a false value on speculative signal 1208 when controlling multiplexer 136 to select current instruction pointer 168, since the current instruction pointer 168 is not a speculative memory address. It is highly likely that the current instruction pointer 168 will hit in instruction cache 104; however, if it does not, instruction fetcher 102 can fetch the cache line specified by current instruction pointer 168 from memory, since the speculative signal 1208 indicates the current instruction pointer 168 is not speculative. Flow ends at block 1322.

The reason a deadlock situation exists if decision block 1316 is true is that the conditions necessary to cause a deadlock are present. The first condition causing the deadlock is a multi-byte branch instruction that wraps across two different cache lines. That is, the first part of the branch instruction bytes are at the end of a first cache line, and the second part of the branch instruction bytes are at the beginning of the next sequential cache line. Because of the possibility of a wrapping branch instruction, the BTAC 142 must store information to predict whether a branch instruction wraps across cache lines so that the control logic 1014 knows whether to fetch the next sequential cache line in order to get the second half of the branch instruction bytes before fetching the cache line at the target address 164. If the BTAC 142 has incorrect prediction information stored in it, the BTAC 142 may incorrectly predict the branch instruction does not wrap, when in fact it does. In this case, the instruction formatter 108 will decode the cache line with the first half of the branch instruction and detect that a branch instruction is present, but that not all of the bytes of the branch instruction are available for decoding. The instruction formatter 108 will then wait for the next cache line. All the while, the pipeline is stalled waiting for more instructions to be formatted in order to execute them.

A second condition causing the deadlock situation is that because the BTAC 142 predicted the branch instruction did not wrap, the branch control logic 1014 fetches the cache line implicated by the target address 164 provided by the BTAC 142 (without fetching the next sequential cache line). However, the target address 164 misses in the instruction cache 104. Consequently, the next cache line that the instruction formatter 108 is waiting for must be fetched from memory.

A third condition causing the deadlock situation is that microprocessor chip sets exist that do not expect instruction fetches from certain memory address ranges and may hang a system or create other undesirable system conditions if the microprocessor generates an instruction fetch from an unexpected memory address range. A speculative address, such target address 164 supplied by the BTAC 142, may cause an instruction fetch from an unexpected memory address range. Therefore, the microprocessor 100 does not fetch a missing cache line at a speculative BTAC predicted target address 164 from memory.

Hence, the instruction formatter 108 and remainder of the pipeline are stalled waiting for another cache line. Simultaneously, the instruction fetcher 102 is stalled waiting for the pipeline to tell it to perform a non-speculative fetch. In a non-deadlocking case, such as if the target address 164 hit in the instruction cache 104, the instruction formatter 108 would format the branch instruction (albeit with incorrect bytes) and provide the formatted branch instruction to the execution stages of the pipeline, which would detect the misprediction and correct for the BTAC 142 misprediction, thereby causing the speculative signal 1208 to become false. However, in the deadlocking situation, the execution stages will never detect the misprediction because the instruction formatter 108 is not supplying the branch instruction to the execution stages because the instruction formatter 108 is waiting for the next cache line. Hence, a deadlock situation occurs. However, the deadlock avoidance logic of FIG. 12 advantageously prevents a deadlock from occurring, as described in FIGS. 12 and 13, thereby enabling proper operation of microprocessor 100.

Although the present invention and its objects, features and advantages have been described in detail, other embodiments are encompassed by the invention. For example, although the write queue has been described with respect to a single-ported BTAC, false misses may also occur with a multi-ported BTAC in some microprocessor configurations, albeit less frequently. Consequently, the write queue may also be employed to reduce the false miss rate of a multi-ported BTAC. Additionally, other situations than the ones described herein may exist in some microprocessors in which the BTAC is not being read, wherein requests queued in the write queue may be written to the BTAC.

Also, although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. An apparatus in a pipelined microprocessor for invalidating a redundant entry for the same branch instruction in a set associative branch target address cache (BTAC), the apparatus comprising:
   a way specifier, generated in a first pipeline stage, for specifying one of a plurality of ways of the BTAC for storing a target address of a branch instruction present in a cache line specified by an instruction cache fetch address missing in the BTAC;
   a request, generated in a second pipeline stage, for requesting the BTAC to write a resolved target address of said branch instruction into said one of said plurality of ways specified by said way specifier in said first pipeline stage, wherein said second pipeline stage is subsequent to said first pipeline stage and said first and second pipeline stages are separated by at least three pipeline stages;
   a status indicator, for indicating whether at least two ways of a set of the BTAC selected by an instruction cache fetch address contain a valid branch target address for a same branch instruction; and
   control logic, coupled to said status indicator, for invalidating one of said at least two ways of said selected set if said status indicator indicates at least two ways of said selected set contain a valid branch target address for a same branch instruction.

2. The apparatus of claim 1, further comprising:
   a register, coupled to said control logic, for storing said instruction cache fetch address, for use by said control logic to invalidate said one of said at least two ways of said selected set.

3. The apparatus of claim 1, wherein said selected set is selected by an index portion of said instruction cache fetch address.

4. The apparatus of claim 1, wherein said control logic clears said status indicator after invalidating said one of said at least two ways of said selected set.

5. The apparatus of claim 1, further comprising:
   a register, coupled to said control logic, for storing data specifying said one of said at least two ways of said selected set to invalidate, for use in invalidating said one of said at least two ways of said selected set.

6. The apparatus of claim 1, further comprising:
   at least two valid signals, coupled to said control logic, each for indicating whether a respective one of said at least two ways of said selected set contain a valid branch target address.

7. The apparatus of claim 1, further comprising:
   at least two match signals, coupled to said control logic, each for indicating whether a tag portion of said instruction cache fetch address matches a tag stored in a respective one of said at least two ways of said selected set.

8. The apparatus of claim 7, further comprising:
   at least two comparators, coupled to said control logic, each for comparing said tag portion of said instruction cache fetch address with said tag stored in said respective one of said at least two ways of said selected set, and generating a respective one of said at least two match signals in response to said comparing.

9. An apparatus in a pipelined microprocessor for invalidating redundant entries for the same branch instruction in a branch target address cache (BTAC), comprising:
- a way specifier, generated in a first pipeline stage, for specifying one of a plurality of ways of the BTAC for storing a target address of a branch instruction present in a cache line specified by an instruction cache fetch address missing in the BTAC;
- a request, generated in a second pipeline stage, for requesting the BTAC to write a resolved target address of said branch instruction into said one of said plurality of ways specified by said way specifier in said first pipeline stage, wherein said second pipeline stage is subseciuent to said first pipeline stage and said first and second pipeline stages are separated by at least three pipeline stages;
- detection logic, for detecting a condition in which more than one valid way of a plurality of ways of a selected set of the BTAC are storing a target address for a same branch instruction; and
- invalidation logic, coupled to said detection logic, for invalidating all but one of said more than one valid way of said selected set.

10. The apparatus of claim 9, further comprising:
- a register, coupled to said invalidation logic, for storing an instruction cache fetch address;
- wherein said selected set is selected by an index portion of said instruction cache fetch address, wherein said invalidation logic invalidates said all but one of said more than one valid ways of said selected set using said instruction cache fetch address stored in said register.

11. The apparatus of claim 10, wherein said detection logic is configured to receive a match signal for each of said plurality of ways of said selected set, said match signal specifying whether an address tag of said way matches an address tag portion of said instruction cache fetch address.

12. The apparatus of claim 11, wherein said detection logic is further configured to receive a valid indicator for each of said plurality of ways of said selected set, said valid indicator specifying whether said way is valid.

13. The apparatus of claim 12, further comprising:
- a flag, coupled to said detection logic, for indicating whether more than one valid way of a plurality of ways of a selected set of the BTAC are storing a target address for a same branch instruction, wherein said detection logic sets said flag to a true value if for more than one of said plurality of ways said match signal and said valid indicator are true.

14. The apparatus of claim 13, wherein said invalidation logic invalidates said one of said more than one valid ways of said selected set if said flag is true.

15. A pipelined microprocessor, comprising:
- an instruction cache, having an address input for receiving an address to select a line including a branch instruction;
- a branch target address cache (BTAC), coupled to said instruction cache, for generating a plurality of indicators in response to said address, each of said plurality of indicators indicating whether a corresponding way in a set of said BTAC selected by said address is storing a valid target address of said branch instruction;
- logic, coupled to said BTAC, configured to invalidate one or more of said plurality of ways of said selected set if said plurality of indicators indicates two or more of said plurality of ways is storing a valid target address of said branch instruction;
- a first pipeline stage, in which said BTAC indicates a miss of said address therein, and in which said BTAC specifies one of said plurality of ways for storing said target address; and
- a second pipeline stage, subsequent to said first pipeline stage, which requests said BTAC to write a resolved target address of said branch instruction into said one of said plurality of ways specified by said BTAC in said first pipeline stage, wherein said first and second pipeline stages are separated by at least three pipeline stages.

16. The microprocessor of claim 15, wherein it is possible for a subsequent fetch of said branch instruction from said instruction cache to reach said first stage prior to a previous fetch of said branch instruction reaching said second stage, such that said selected set of said BTAC stores a valid target address of said branch instruction in two or more of said plurality of ways.

17. A method for invalidating redundant entries in a set-associative branch target address cache (BTAC) for the same branch instruction, the method comprising:
- determining whether a tag of more than one way of a set of the BTAC selected by an index portion of an instruction cache fetch address matches a tag portion of the instruction cache fetch address and is valid;
- invalidating all but one way of the selected set, if more than one way of the selected set is valid and matching;
- indicating, in a first pipeline stage, a miss of said address in said BTAC and specifying one of said plurality of ways for storing a target address of a branch instruction included in a cache line selected by said address in an instruction cache; and
- requesting said BTAC, in a second pipeline stage, to write a resolved target address of said branch instruction into said one of said plurality of ways specified by said BTAC in said first pipeline stage, wherein said second pipeline stage is subsequent to said first pipeline stage and said first and second pipeline stages are separated by at least three pipeline stages.

18. The method of claim 17, further comprising:
- storing an indication that a tag of more than one way of a set of the BTAC selected by an index portion of an instruction cache fetch address matches a tag portion of the instruction cache fetch address and is valid in response to said determining.

19. The method of claim 17, further comprising:
- storing said instruction cache fetch address, in response to said determining.

20. The method of claim 17, further comprising:
- storing an indication of said all but one way of the selected set that are to be invalidated, in response to said determining.

21. A method for invalidating a redundant entry for the same branch instruction in the same set of an N-way set associative branch target address cache (BTAC), the method comprising:
- selecting an N-way set in the BTAC with a lower portion of an instruction fetch address;
- comparing N address tags of N corresponding ways of said N-way set with an upper portion of said instruction fetch address;
- determining whether two or more of said N address tags match said upper portion and are valid;
- invalidating, if two or more of said N address tags match said upper portion and are valid, one or more of said N ways corresponding to said two or more of said valid N address tags matching said upper portion;

indicating, in a first pipeline stage, a miss of said address in said BTAC and specifying one of said N ways for storing a target address of a branch instruction included in a cache line selected by said address in an instruction cache; and requesting said BTAC, in a second pipeline stage, to write a resolved target address of said branch instruction into said one of said N ways specified by said BTAC in said first pipeline stage, wherein said second pipeline stage is subsequent to said first pipeline stage and said first and second pipeline stages are separated by at least three pipeline stages.

22. A computer program embodied on a computer-readable medium, comprising:

computer-readable program code for providing a pipelined microprocessor, said program code comprising:

first program code for providing an instruction cache, having an address input for receiving an address to select a line including a branch instruction;

second program code for providing a branch target address cache (BTAC), coupled to said instruction cache, for generating a plurality of indicators in response to said address, each of said plurality of indicators indicating whether a corresponding way in a set of said BTAC selected by said address is storing a valid target address of said branch instruction;

third program code for providing logic, coupled to said BTAC, configured to invalidate one or more of said plurality of ways of said selected set if said plurality of indicators indicates two or more of said plurality of ways is storing a valid target address of said branch instruction;

fourth program code for providing a first pipeline stage, in which said BTAC indicates a miss of said address therein, and in which said BTAC specifies one of said plurality of ways for storing said target address; and fifth program code for providing a second pipeline stage, subsequent to said first pipeline stage, which recluests said BTAC to write a resolved target address of said branch instruction into said one of said plurality of ways specified by said BTAC in said first pipeline stage, wherein said first and second pipeline stages are separated by at least three pipeline stages.

23. The computer program embodied on a computer-readable medium of claim 22, wherein it is possible for a subsequent fetch of said branch instruction from said instruction cache to reach said first stage prior to a previous fetch of said branch instruction reaching said second stage, such that said selected set of said BTAC stores a valid target address of said branch instruction in two or more of said plurality of ways.

* * * * *